US011789914B2

(12) United States Patent
Sahu et al.

(10) Patent No.: US 11,789,914 B2
(45) Date of Patent: Oct. 17, 2023

(54) DATA CORRECTNESS OPTIMIZATION

(71) Applicant: zeotap GmbH, Berlin (DE)

(72) Inventors: Swapnasarit Sahu, Berlin (DE);
Ernest Kirubakaran Selvaraj, Berlin (DE); Tushar Agarwal, Berlin (DE); Projjol Banerjea, Berlin (DE); Daniel Heer, Berlin (DE); Sathish Kumar K S, Berlin (DE)

(73) Assignee: zeotap GmbH, Berlin (DE)

( * ) Notice: Subject to any disclaimer, the term of this patent is extended or adjusted under 35 U.S.C. 154(b) by 0 days.

(21) Appl. No.: 16/878,713

(22) Filed: May 20, 2020

(65) Prior Publication Data
US 2021/0365420 A1    Nov. 25, 2021

(51) Int. Cl.
*G06F 16/00* (2019.01)
*G06F 16/215* (2019.01)
*G06F 17/18* (2006.01)

(52) U.S. Cl.
CPC ............ *G06F 16/215* (2019.01); *G06F 17/18* (2013.01)

(58) Field of Classification Search
None
See application file for complete search history.

(56) References Cited

U.S. PATENT DOCUMENTS 11,093,740 B2 *   8/2021   Florencio ............... G06N 20/00

OTHER PUBLICATIONS

Birnbaum et al. "Utility Measurement: Conftgural-Weight Theory and the Judge's Point of View", Journal of Experimental Psychology: Human Perception and Performance, 18(2): 331-346, May 1992.
Burges et al. "Learing to Rank Using Gradient Descent", Proceedings of the 22nd International Conference on Machine Learning, ICML 05, Bonn, Germany, Aug. 7, 2005, p. 89-96, Aug. 7, 2005.
Geyik et al. "Towards Data Quality Assessment in Online Advertising.", ArXiv Preprint ArXiv:1711.11175.vl, 10 P., Nov. 30, 2017.
(Continued)

*Primary Examiner* — Bai D Vu

(57) ABSTRACT

Method and system for providing ground truth dataset and use thereof for improving data correctness. Datasets comprising data elements are received from different sources, each data element including an identifier and at least one attribute value associated therewith. Data correctness values are determined for the attribute values, each associated with a probability that an attribute value is correct. Data element with single data correctness value is added to the ground truth dataset for each attribute value for each identifier with which a respective attribute value is associated based on the determined data correctness values for the attribute values, whereby the data correctness values in the ground truth dataset define probability distributions of data correctness for the attribute values. Data correctness values for attribute values of data elements of a new dataset can be determined based on overlapping data compared in the ground truth dataset and the new dataset.

18 Claims, 9 Drawing Sheets

(56) References Cited

OTHER PUBLICATIONS

Williams et al. "Pleasing the Adverising Oracle: Probabilistic Prediction From Sampled, Aggregated Ground Truth", Proceedings of the Eighth International Workdshop on Data Mining for Online Advertising, ADKDD '14, New York, NY, USA, Aug. 24, 2014, p. 1-9, Aug. 24, 2014.

European Search Report and the European Search Opinion dated Sep. 30, 2021 From the European Patent Office Re. Application No. 21174979.1. (11 Pages).

Choudhury "How This Berlin-Based Startup Is Using Deep Learning to Drive Growth in Customer Intelligence", Retrieved From the Internet, Analyticsindiamag.com, XP055843873, p. 1-6, Apr. 24, 2020.

* cited by examiner

DATA CORRECTNESS OPTIMIZATION

FIELD AND BACKGROUND OF THE INVENTION

The present invention, in some embodiments thereof, relates to data correctness optimization, and, more specifically, but not exclusively, to optimizing data correctness using a ground truth dataset.

Data aggregators and data processors receive data from multiple data sources, such as devices, sensors, or servers of multiple data partners. Data correctness of the data can vary between different data sources. Data is considered to be correct if a value stored in the data corresponds to a real measurement value. In order to maintain correctness of the data in their data storage, external correctness checks can be performed against the data.

The data may include, for example, weather data for providing climate or weather forecasts, user information for targeted advertising, traffic information for route optimization, health information of users for clinical studies, or any other information received from multiple data sources.

For targeted advertising, the data in the data storage may, for example, be tested for correctness against external sources for an On Target Reach (OTR). OTR is defined as an accuracy to reach a certain audience type defined by one or more attributes, properties and/or parameters. For example, the data may include user data with information about gender and age of a user. The data may be processed by a data processor for selecting 1000 users of female gender and an age between 18 to 24 years. The data may include incorrect values, for example, outdated and/or initially incorrect values, for example, only 881 of the 1000 users are of female gender and have an age between 18 to 24 years. In this case, the OTR for the data is 88.1%.

Applying OTR tests for determining a correctness of the data is known in the prior art. In the prior art, the OTR tests may be, for example, panel based. The panel includes users of which the information about gender and age are known. A software development kit (SDK) can be installed on a user's mobile phone to check with the user, if the user has been correctly selected.

For example, the OTR test may be performed by targeting a user with a certain information, such as an advertisement, which is provided to the user based on targeting criteria, e.g., gender and age. The panel can be used to check whether the information was provided to the correct audience or not.

The number of users forming the panel is limited, such that the number of data points for providing meaningful statistics for certain target criteria may be too small. This means that the statistics may be only based on a very small set of overlap between a panel and target audience. This may result in a significantly large sampling error.

Moreover, the OTR tests may be expensive, since every time a subset of data is selected from the data, an OTR test has to be performed in order to find the correctness of the selected subset of data.

Furthermore, some applications may require data correctness to exceed a certain threshold value, such that a higher correctness of the data needs to be reached.

Other methods for evaluating data correctness are for example known from Sahin Geyik et al. "Towards Data Quality Assessment in Online Advertising" published in arXiv:1711.11175 [cs.AI] and Melinda Han Williams et al. "Pleasing the advertising oracle: Probabilistic prediction from sampled, aggregated ground truth", ADKDD'14: Proceedings of the Eighth International Workshop on Data Mining for Online Advertising, August 2014, Pages 1-9. Sahin Geyik et al provide a method for estimating a quality or goodness of a data source. Melinda Han Williams et al. explore methods for building probabilistic classification models using aggregate data of third-party measurement companies, which act as "oracles" in assessing ground truth.

SUMMARY OF THE INVENTION

It can be seen as an object of the present invention to provide a method and a data correctness management system for optimizing data correctness with reduced costs.

In a first aspect of the present invention a computer implemented method for providing a ground truth dataset is presented. The method comprises using one or more processors for:

receiving a plurality of datasets from different data sources, the datasets comprising a plurality of data elements, wherein each data element includes an identifier and at least one attribute value associated with the identifier, determining data correctness values for the attribute values, wherein a data correctness value is associated with a probability that an attribute value is correct, adding a data element with a single data correctness value for each attribute value for each identifier with which a respective attribute value is associated to the ground truth dataset based on the determined data correctness values for the attribute values such that the data correctness values in the ground truth dataset define probability distributions of data correctness for the attribute values, and outputting the ground truth dataset, the ground truth dataset is used to determine data correctness of attribute values included in at least one new dataset.

Since the ground truth dataset includes a single data correctness value for each attribute value for each identifier with which a respective attribute value is associated, the ground truth dataset can be used for determining data correctness values for attribute values in datasets received from different data sources after the ground truth dataset is established. This can allow to reduce costs and/or calculation load compared to methods for determining data correctness values known in the prior art. Furthermore, sampling error can be reduced compared to methods known in the prior art and a higher coverage can be achieved. The ground truth dataset can for example be provided based on data related to targeted advertising, targeted providing of information, clinical studies, predictive maintenance, or forecasting, such as weather forecasting, climate forecasting, energy demand and supply forecasting, or any other application that benefits from optimized data correctness of data provided by multiple data sources. Using a ground truth dataset for determining data correctness values for the attribute values can allow to eliminate a need for providing data correctness values for the attribute values by the data sources or by another external source. The data correctness values can be determined in a data correctness management system using the ground truth dataset.

An attribute value is a value of a respective attribute. Attributes values can for example include values for user information such as gender values and age values. Gender values can for example be categorical values such as male, female, or diverse. Alternatively, the gender values can be integer values associated with a respective categorical value, e.g., 1 corresponds to female, 2 corresponds to male, and 3 corresponds to diverse. Age values can for example be expressed in integer values of years or can include ranges, such as between 18 years and 24 years. Attribute values may also for example include other user information, such as health information, e.g., health conditions of users, such as high blood pressure, Diabetes mellitus, a virus immunity or any other health condition. Attribute values can additionally or alternatively include values of sensor information such as measured values, e.g., humidity values, temperature values, time values, pressure values, capacity values, energy values, voltage values, current values, or the like.

Adding a data element with a single data correctness value for each attribute value for each identifier with which a respective attribute value is associated means that a data element including a respective identifier, the at least one attribute value and at least one single data correctness value associated with the at least one attribute value is added to the ground truth dataset for each of the identifiers included in the data sets. The data element added to the ground truth dataset can for example include the respective identifier, an attribute value associated with the respective identifier and a single data correctness value for the attribute value. A data element including the respective identifier, the attribute value associated with the respective identifier and the single data correctness value for the attribute value can be added to the ground truth dataset for each combination of identifier and attribute value associated with the identifier. Alternatively, the data element can also include the respective identifier, a plurality of attribute values, and a single data correctness value associated with each one of the attribute values.

Adding a data element with a single data correctness value for each attribute value for each identifier with which the attribute values is associated to the ground truth dataset can be performed based on a triggering event. For example, adding a data element with a single data correctness value for each attribute value for each identifier with which the attribute value is associated to the ground truth dataset can be performed when at least one data correctness value is determined for each attribute value for each data source. The triggering event can also for example be that a certain number of data correctness values is determined or data correctness values are determined for a certain ratio of data elements received from the different data sources. The triggering event can also for example be that data correctness values are determined for a random sample derived from each dataset or each data source. This can allow to ensure that the ground truth dataset can be effectively used for determining data correctness values for attribute values provided with data elements of new datasets.

Outputting the ground truth dataset may be performed by storing the ground truth dataset. This can allow for further using the ground truth dataset to determine data correctness of attribute values included in at least one new dataset. Outputting the ground truth dataset may also be performed by displaying the ground truth dataset or parts of it, e.g., probability distributions of data correctness for attribute values, on a display.

The method comprises steps that are performed by one or more processors. Alternatively or in addition, the steps may be carried out by a cloud storage service. The cloud storage service is performed by a server system. The different data sources may be client systems which interact with the server system to provide the plurality of datasets. The server system may receive the plurality of datasets from different data sources in the form of files transferred via a wireless or wire based connection through a network or the internet. The network may be a local, metropolitan or wide area network.

The data correctness values for the attribute values can be determined by a method for determining a data correctness value known in the prior art. Methods for determining the data correctness value for the attribute values known in the prior art can include a panel based method for determining the data correctness value. In a panel based method, a panel includes identifiers for which the attribute values are known. The attribute values of a received dataset can be checked against the panel, e.g., it can be determined whether the dataset includes correct data compared to the panel. Methods for determining the data correctness values for the attribute values known in the prior art can also include using calibration measurements for determining real measurement values of attributes and comparing the attribute values of a received dataset against the calibration measurements. These methods allow to provide initial data correctness values even if the data sources do not provide data correctness values for the attribute values. For example, if 1000 attribute values are checked against the panel or the calibrated measurements of which 750 are correct, a data correctness value of 75% or 0.75 can be assigned to each of the attribute values received from the dataset.

A data correctness value for an attribute value received from a respective data source can be determined for a subset of data elements received from the respective data source. The data correctness value for the attribute value determined for the subset of the data elements can be assigned to the attribute values of the same attribute of the other data elements received from the respective data source. This allows to reduce the required processing as less data elements have to be processed. The data elements of the subset can for example be randomly selected from the respective dataset received from the respective data source. The subset can include a statistically significant number of data elements received from a respective data source. This allows to ensure that the assigned data correctness values are meaningful.

The single data correctness value for the respective attribute value for a respective identifier can be determined based on data correctness values for the attribute value received from different data sources, when two or more data elements with the respective identifier and an identical attribute are included in the plurality of datasets received from the different data sources. This allows to optimize the single data correctness values for the attribute values in the ground truth dataset which allows to determine data correctness for attribute values of new datasets with higher accuracy. For example, the single data correctness value for the respective attribute value for a respective identifier can be determined for each case in which two or more data elements with identical identifier and identical attribute are included in the plurality of datasets received from different data sources. The single data correctness value for the respective attribute value for a respective identifier can be determined based on all data elements with the respective identifier and identical attribute value. If different attribute values are provided by different data sources for the same identifier, the attribute values can be in conflict. In cases were only two attribute values are possible, e.g., true or false, an unknown data correctness value for the other attribute value can be determined based on a known data correctness value, e.g., by calculating $1-p$ with p the known data correctness value for the attribute value. If the attribute values provided by the different data sources are identical and the data correctness value is above 50%, the data correctness value for the attribute value is increased. In cases were more than two attribute values are possible, e.g., for age or ranges of age, an unknown data correctness value can only be determined for a specific attribute value in case that sufficient information is included in the respective data element. In order to have sufficient information, data correctness values for n−1 of n possible attribute values need to be known. The data correctness value that the correct attribute value is any of n attribute values is 100%. The unknown data correctness value $p_u$ can therefore be determined by calculating $$p_u = 1 - \sum_{i}^{n-1} p_i$$

with $p_i$, a data correctness value of one of the n−1 other attribute values.

For example, if age is divided in 6 age ranges, such as below 18 years, 18 to 24 years, 24 to 30 years, 30 to 34 years, 35 to 55 years, and above 55 years, it is sufficient to know the data correctness value for 5 of the age ranges in order to determine an unknown data correctness value of the 6th age range. In this case, the data correctness value that the correct attribute value is in any of the age ranges is 100%. The unknown data correctness value $p_6$ of the 6th age range can therefore be determined by calculating $$p_6 = 1 - \sum_{i=1}^{5} p_i$$

with $p_i$, a data correctness value of one of the 5 other age ranges.

Determining the single data correctness value for the respective attribute value for a respective identifier can for example be triggered by a triggering event. Triggering events can include a certain time period, such as two month passed since the first dataset was received, a certain amount of data received, such as a certain number of attribute values received or a certain amount of datasets received, or any other triggering event. The triggering event can be adapted in order to improve the ground truth dataset.

The single data correctness value for the respective attribute value for the respective identifier can be determined by calculating $$p = \frac{\prod_{i}^{n} p_i}{\prod_{i}^{n} p_i + \prod_{i}^{n} (1 - p_i)}$$

wherein p is the single data correctness value, n is a number of the different data sources, and $p_i$ is a probability for the attribute value received from data source i to be correct. The number n of different data sources can be determined by counting the number of data sources from which datasets have been received. This allows to increase the data correctness value of an additional data element when different data sources provide the same attribute value with a data correctness value above 50%. In case that different data sources provide different attribute values, the data correctness value for an attribute value may be determined based on data correctness values from the same attribute value and unknown data correctness values determined based on known data correctness values for the other attribute values.

Additionally and/or alternatively, with the single data correctness value for the respective attribute value for a respective identifier can be determined based on calculating $$p_i = \frac{\sum_{j}^{k} p_{ij}}{k}$$

wherein $p_i$ is the mean probability for the attribute value received from the data source i to be correct, k is a number of probabilities for the attribute value of the data element received from the data source i to be correct, and $p_{ij}$ is a j-th probability for the attribute value of the data element of the data source i to be correct, when two or more data elements with the respective identifier and an identical attribute are included in one or more datasets received from the same data source. The number k of probabilities for the attribute value of the data element received from the data source i to be correct can be determined by counting the number of different probabilities for the attribute value of the data element received from the data source i to be correct. The probabilities for the attribute value of the data element received from the data source i to be correct correspond to the data correctness values and the j-th probability of the attribute value of the data element of the data source i to be correct corresponds to the j-th data correctness value. This allows to account for receiving attribute values from the same or different data sources, as the method for determining the data correctness value for the attribute value of the additional data element can be based on whether the attribute values are provided by different data sources or the same data source.

In another aspect a computer implemented method for optimizing data correctness using a ground truth dataset as provided by any embodiment of the method for providing a ground truth dataset is presented. The method comprises using one or more processors for:

receiving a new dataset from a data source, the new dataset comprising a plurality of data elements, wherein each data element includes an identifier and at least one attribute value associated with the identifier, and determining data correctness values for the attribute values of the data elements of the new dataset based on the data correctness values for the attribute values of the data elements with known identifiers of the ground truth dataset, wherein a known identifier is an identifier which is included in the ground truth dataset and in the new dataset.

Since the data correctness values for the attribute values of the data elements of the new dataset can be determined based on data correctness values for the attributes values of the data elements with known identifiers of the ground truth dataset, data correctness values of new datasets can be determined faster and/or with reduced costs. Furthermore, data correctness can be optimized.

The method for optimizing data correctness can for example be used in climate or weather forecasting systems in order to improve climate or weather forecasts. Furthermore, the method can also be used in energy grid systems in order to improve forecasting how much energy will be required by different loads at certain times. For example, energy can be distributed based on the forecast and due to improved data correctness, the risk of providing too much or too low energy to one of the loads of the energy grid system can be mitigated. The method for optimizing data correctness can also be used in any other application that benefits from optimized data correctness of data provided by multiple data sources, such as targeted advertising or targeted providing of other information, such as health information or warnings.

A data correctness value for at least one attribute value of data elements of the new dataset with unknown identifier can be determined based on a probability distribution of data correctness for a respective attribute value, when the new dataset comprises a threshold level of data elements including a known identifier, wherein an unknown identifier is an identifier which is not included in the ground truth dataset. A respective data correctness value can also be determined for each attribute value of the data elements of the new dataset with unknown identifier based on a probability distribution of data correctness for a respective attribute value. This allows to estimate data correctness values for attribute values of data elements of the new dataset with unknown identifier.

The threshold level of data elements with known identifier can for example be a threshold ratio of data elements including a known identifier compared to a total number of data elements in the new dataset, such as at least 8% of data elements of the new dataset including a known identifier or for example between 8% and 10% of data elements of the new dataset including a known identifier.

A modified average data correctness value can be assigned as data correctness value for the attribute values of the data elements of the new dataset with unknown identifier. The modified average data correctness value can be determined based on the data correctness values for the attribute values of the data elements with known identifiers.

The method for optimizing data correctness may further comprise the following steps:
  obtaining the probability distribution of data correctness for the respective attribute value based on the ground truth dataset,
  binning data correctness values of the probability distribution of data correctness for the respective attribute value, such that each bin includes data elements of the ground truth dataset with data correctness values for the respective attribute value within a range of data correctness values for the respective attribute value,
  extracting, from each bin, a number of samples each including a number of data elements,
  determining, for each sample, a number of data elements with identifiers in a respective sample which are identical to identifiers in the new dataset, wherein the respective sample is discarded if the number of data elements with identifiers in the respective sample which are identical to identifiers in the new dataset is below a threshold identifier number and wherein the respective sample is further processed if the number of data elements with identifiers in the respective sample which are identical to identifiers in the new dataset is equal to or above the threshold identifier number,
  determining, for each sample, a sample probability score based on the data correctness values for the respective attribute value of the data elements with identical identifiers in the ground truth dataset and the new dataset,
  determining, for each bin, a bin probability score of a respective bin based on the sample probability scores of the respective bin,
  determining, for each bin, a weighted bin score by multiplying a respective bin probability score with a respective number of data elements with identifiers in the respective bin which are identical to identifiers in the new dataset,
  determining, for each bin, a confidence score based on a respective weighted bin score and the respective number of data elements with identifiers in the respective bin which are identical to identifiers in the new dataset,
  determining a final score by dividing a sum of the confidence scores by a sum of the number of data elements with identifiers in the bins which are identical to identifiers in the new dataset, and
  assigning the final score as data correctness value to the attribute value of the data elements of the new dataset with unknown identifier.

These steps of the method can be performed for a respective attribute value of each attribute included in the ground truth dataset for determining a final score as data correctness value for all attribute values of the attribute. The final score as determined for the respective attribute value can be assigned to all attribute values of the same attribute of the data elements of the new dataset with unknown identifier. This allows to reduce a bias caused by possible skewness of data correctness values present in the ground truth dataset, i.e., a problem of skewness can be solved. The ground truth dataset can contain skewed information, i.e., for some data correctness values there may be much more known identifiers than for others which could lead to a bias when determining the data correctness value for the attribute values of the data elements with unknown identifier based on the data correctness value for the attribute values of the data elements with known identifier. Using an average value of the data correctness values for the attribute values of the data elements with known identifier may result in an incorrect data correctness value due to the bias of the skewness. This bias can be mitigated by determining the final score based on the aforementioned steps.

The range of data correctness values for the respective attribute value of the bins can for example be 3%, i.e., 0.03, 5%, i.e., 0.05, or any other value.

The number of samples can for example be 10, 20, 50 or any other number. The samples can for example be extracted randomly or extracted randomly with replacement. The samples can for example have a size of 10000, 20000, 50000 data elements or more.

The threshold identifier number for discarding and further processing of samples can for example depend on a ratio of identical identifiers such as 20% or 50%.

The sample probability score can be determined as mean value of the data correctness values of the sample.

The bin probability score can be determined as median value of the sample probability scores.

The confidence score can be the upper confidence score or the lower confidence score. Alternatively, both, the upper confidence score and the lower confidence score can be determined. When upper confidence score and lower confidence score are determined, an upper final score can be determined by dividing a sum of the respective upper confidence scores by a sum of the number of data elements with identifiers in the bins which are identical to identifiers in the new dataset and a lower final score can be determined by dividing a sum of the respective lower confidence scores by a sum of the number of data elements with identifiers in the bins which are identical to identifiers in the new dataset. The final score can be the upper final score or the lower final score. Preferably, the lower final score is used as final score. A difference between the upper final score and the lower final score can be determined. This difference can allow to determine a confidence in the final score.

The confidence score for each of the bins can be determined based on Wilson confidence interval. Determining the confidence score using Wilson confidence interval can allow to improve correctness of data correctness values. Alternatively, the confidence score for each of the bins can also be determined based on Wilson score interval with continuity correction, Jeffreys interval, Clopper-Pearson interval, Agresti-Coull interval, normal approximation interval, or any other binomial proportion confidence interval.

The method for optimizing data correctness may further comprise adding the data elements of the new dataset with unknown identifier for which the data correctness values for the attribute values were determined, to the ground truth dataset.

Adding the data elements of the new dataset with unknown identifier for which the data correctness values for the attribute values were determined, to the ground truth dataset can be performed for attribute values which have a data correctness value above a threshold data correctness value, for attribute values for which the difference between lower final score and upper final score is below a confidence threshold value, or for attribute values which have a data correctness value above a threshold data correctness value and for which the difference between lower final score and upper final score is below a confidence threshold value. The threshold data correctness value can for example be 60%, 70%, or 80%. The confidence threshold value can for example be a lower confidence threshold value, e.g., 10%, 5%, or 4%. This allows to further optimize the data correctness of the ground truth dataset as data elements with unknown identifiers for which attribute values have a low single data correctness value are not added to the ground truth dataset. The same is true for attribute values which have a large difference between upper and lower confidence scores, i.e., for which the data correctness value is only determined with a low confidence. Since these values are not added an additional error can be reduced.

The data correctness values for a respective attribute value of respective data elements of the ground truth dataset can be compared to data correctness values for the respective attribute value of the respective data elements determined by a method for determining a data correctness value known in the prior art in dependence of a triggering event. The triggering event can for example be a certain time interval or a certain amount of data received. This allows to ensure that the data correctness values are within a certain confidence interval over time.

The data correctness values for the respective attribute value of the respective data elements of the ground truth dataset can be adjusted based on a difference between the data correctness values for the respective attribute value of the respective data elements of the ground truth dataset and the data correctness values for the respective attribute value of the respective data elements determined by the method for determining a data correctness value known in the prior art. This allows recalibrating the ground truth dataset by validating the ground truth dataset based on a method for determining a data correctness value known in the prior art. This allows to ensure over time with a certain confidence that the data correctness values for the attribute values in the ground truth dataset are correct. This eventually allows to ensure that data correctness values determined based on the ground truth dataset are correct within a certain confidence interval.

The method for optimizing data correctness may further comprise the following steps:
  obtaining a probability distribution of data correctness for the respective attribute value based on the ground truth dataset,
  binning of data correctness values of the probability distribution of data correctness for the respective attribute value, such that each bin includes data elements of the ground truth dataset with data correctness values for the respective attribute value within a range of data correctness values for the respective attribute value,
  determining for each bin a bin data correctness value for the respective attribute value by a method for determining a data correctness value known in the prior art,
  learning an adjustment weight for the data correctness values for the respective attribute value for the data elements for each bin based on minimizing a difference between a median data correctness value for the respective bin determined based on the data correctness values for the respective attribute value in a respective bin weighted based on a current adjustment weight and the bin data correctness value for the respective bin, and
  adjusting for each data element the data correctness value for the respective attribute value in the ground truth dataset based on the respective adjustment weight.

These steps may allow an improved recalibration of the ground truth dataset.

The bins including data correctness values of the probability distribution of data correctness for the respective attribute value can for example have a range of data correctness values of 1%, 5%, or 10%. The size of the bins, i.e., the range of data correctness values included in each of the bins allows to balance cost and accuracy. A smaller bin size results in a higher number of bins which increases calculation load and cost. A smaller bin size on the other hand increases accuracy. The accuracy gain of using bin sizes below 5% is only small.

The method for determining a data correctness value as known in the prior art may be, for example, the panel based method.

The learning of an adjustment weight can for example be performed based on machine learning methods, such as neural networks or gradient descent method, e.g., stochastics gradient descent method. An adjustment weight is determined for each bin. The adjustment weights can be adjusted during the learning in order to minimize the difference between the data correctness values in the ground truth dataset and the data correctness values determined by the method for determining a data correctness value known in the prior art. This allows to optimize the data correctness in the ground truth dataset.

The gradient descent method may include the steps of:
  providing an initial adjustment weight, e.g. 0.5, as adjustment weight, and repeating the following steps until a convergence condition is fulfilled, e.g., a difference, such as Root-Mean-Squared-Error (RMSE), between the median data correctness value for the respective bin and the bin data correctness value for the respective bin being below a recalibration threshold value:
  determining the median data correctness value for the respective bin based on the data correctness values in the respective bin and the adjustment weight, determining a difference between the median data correctness value for the respective bin and the bin data correctness value, e.g., RMSE, determining a gradient of difference, e.g., the RMSE loss, with respect to the adjustment weight, adjusting the adjustment weight based on the adjustment weight, a learning rate, and the gradient.

Adjusting for each data element the data correctness value for the respective attribute value in the ground truth dataset based on the respective adjustment weight can include calculating an adjusted single data correctness value for the attribute values for the identifiers based on $$p_{l+1} = \frac{p_l \cdot w}{p_l \cdot w + (1 - p_l) \cdot (1 - w)},$$

with $p_{l+1}$ adjusted single data correctness value, $p_l$ the current single data correctness value, and w the respective adjustment weight for the bin in which the single data correctness value is located, e.g., if the single data correctness value is 0.62, the adjustment weight for the bin with data correctness value ranges between 0.6 to 0.65 is used.

Determining, for each bin, a bin data correctness value for the respective attribute value by a method for determining a data correctness value known in the prior art can be performed based on a subset of data elements selected from the respective bin. This allows to reduce processing load and cost. The subset of data elements can for example be randomly selected.

In a further aspect a data correctness management system for optimizing data correctness using a ground truth dataset is presented. The data correctness management system comprises a transceiver and one or more processors. The one or more processors are coupled to the transceiver and configured to execute code comprising program instructions to receive, via the transceiver, a plurality of datasets from different data sources the datasets comprising a plurality of data elements, each data element including an identifier and at least one attribute value associated with the identifier, program instructions to determine data correctness values for the attribute values, a data correctness value being associated with a probability that an attribute value is correct, program instructions to add a data element with a single data correctness value for each attribute value for each identifier with which a respective attribute value is associated to the ground truth dataset based on the determined data correctness values for the attribute values such that the data correctness values in the ground truth dataset define probability distributions of data correctness for the attribute values, and program instructions to determine data correctness values for attribute values of data elements of new datasets based on the data correctness values for the attribute values of the data elements with known identifiers of the ground truth dataset. A known identifier is an identifier which is included in the ground truth dataset and in the new dataset.

The one or more processors may execute one or more functional modules implemented via one or more software modules, hardware modules and/or a combination thereof, for example, a ground truth dataset unit, a data correctness value determiner and a ground truth dataset recalibration unit. The code can comprise the program instructions which are implemented in the functional modules.

The data correctness value determiner can be configured for determining a data correctness value for at least one attribute value of data elements of the new dataset with unknown identifier based on a probability distribution of data correctness for the respective attribute value, when the new dataset comprises a threshold level of data elements including a known identifier, wherein an unknown identifier is an identifier which is not included in the ground truth dataset. The data correctness value determiner can also be configured for determining a respective data correctness value for each attribute value of the data elements of the new dataset with unknown identifier based on a probability distribution of data correctness for a respective attribute value.

The data correctness management system can further comprise a ground truth dataset recalibration unit. The ground truth dataset recalibration unit can be configured for comparing the data correctness values for a respective attribute value of respective data elements of the ground truth dataset to data correctness values for the respective attribute value of the respective data elements determined by a method for determining a data correctness value known in the prior art. The ground truth dataset recalibration unit can be further configured for adjusting the data correctness values for the respective attribute value of the respective data elements of the ground truth dataset based on a difference between the data correctness values for the respective attribute value of the respective data elements of the ground truth dataset and the data correctness values for the respective attribute value of the respective data elements determined by the method for determining a data correctness value known in the prior art.

In a further aspect of the present invention a computer program product for optimizing data correctness using a ground truth dataset is presented. The computer program product comprises code executing program instructions for causing one or more processors of the data correctness management system to carry out the data correctness optimizing method and/or the ground truth dataset providing method. Alternatively and/or additionally, the computer program product can comprise code executing program instructions for causing one or more processors of the data correctness management system to carry out any embodiment of the data correctness optimizing method and/or the ground truth dataset providing method, when the computer program product is run on the data correctness management system.

The computer program product can be configured for optimizing data correctness using a ground truth dataset. The computer program product can comprise a plurality of program instructions which when executed by at least one processor cause the at least one processor to:

receive a plurality of datasets from different data sources, the datasets comprising a plurality of data elements, wherein each data element includes an identifier and at least one attribute value associated with the identifier;

determine data correctness values for the attribute values, wherein a data correctness value is associated with a probability that an attribute value is correct; and add a data element with a single data correctness value for each attribute value for each identifier with which a respective attribute value is associated to the ground truth dataset based on the determined data correctness values for the attribute values such that the data correctness values in the ground truth dataset define probability distributions of data correctness for the attribute values.

The computer program product can further comprise program instructions for causing the at least one processor to:

receive a new dataset from a data source, the new dataset comprising a plurality of data elements, wherein each data element includes an identifier and at least one attribute value associated with the identifier, and determine data correctness values for the attribute values of the data elements of the new dataset based on the data correctness values for the attribute values of the data elements with known identifiers of the ground truth dataset, wherein a known identifier is an identifier which is included in the ground truth dataset and in the new dataset.

In a further aspect a computer readable medium is presented for storing the computer program product. Alternatively and/or additionally, the computer readable medium may store the computer program product according to any embodiment of the computer program product.

The present invention may be used, for example, in targeted advertising. The present invention can also be used by any application that benefits from optimized data correctness of the data used by the application, such as for example targeted providing of information or forecasting, such as climate forecasting, weather forecasting, traffic forecasting, energy demand and supply forecasting, or other forecasting. The present invention may also for example be used in predictive maintenance.

The method for optimizing data correctness can for example be used in an energy management system, such as an electric grid including energy storages and energy sources that only temporarily provide energy, e.g., wind energy sources which provide energy when wind is blowing or solar energy sources which provide energy when sun is shining. Optimized data correctness for the expected energy provided by the wind energy sources and solar energy sources, e.g., using improved climate forecasts or weather forecasts, can allow to provide an improved forecast for supply and demand of energy in the energy management system.

The ground truth dataset providing method, the data correctness optimizing method, the data correctness management system, the computer program product, and the computer readable medium may comprise similar and/or identical embodiments.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the following drawings.

DESCRIPTION OF SPECIFIC EMBODIMENTS OF THE INVENTION

Figure 1:
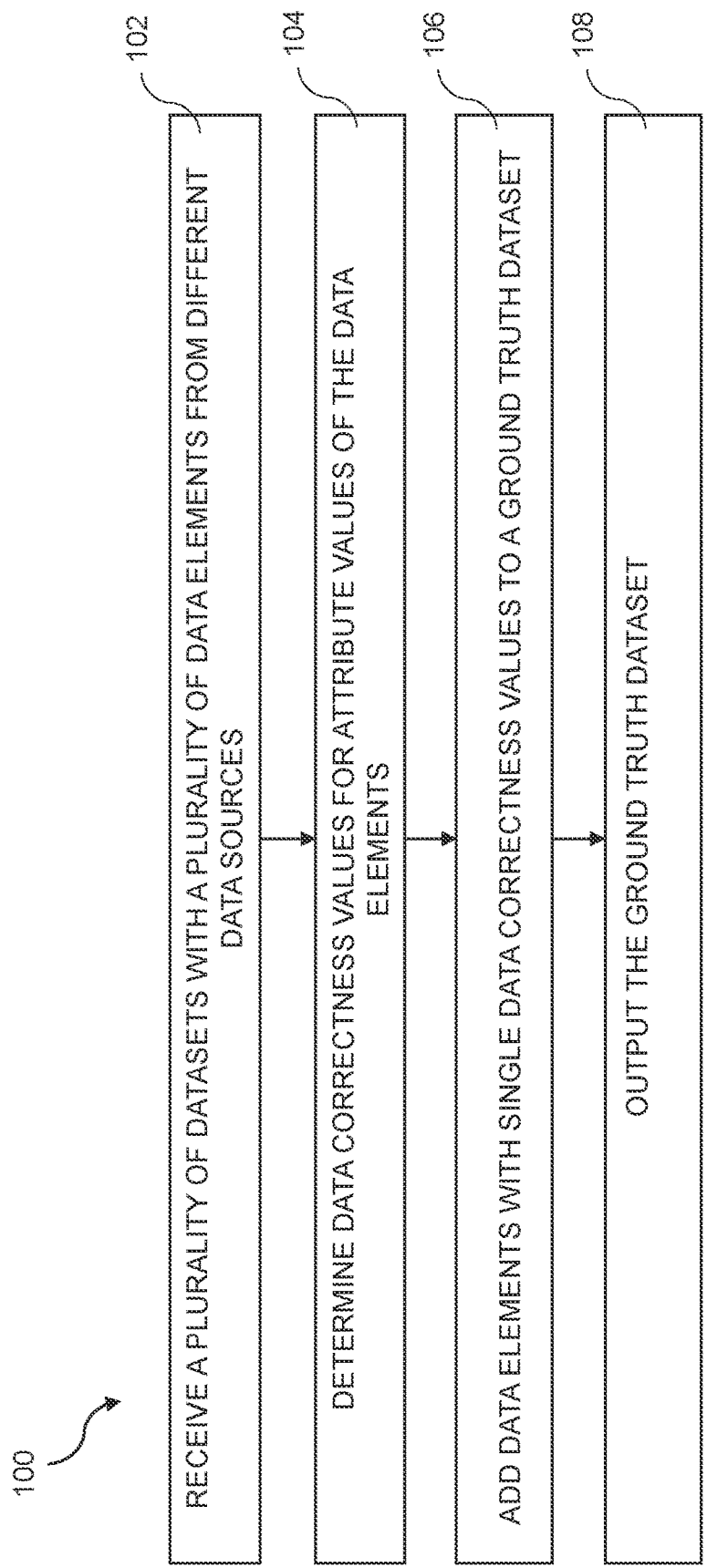
FIG. 1 is a flowchart of an exemplary process of a first embodiment of a method of providing a ground truth dataset, according to some embodiments of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The computer readable program instructions may be further executed as one or more web and/or cloud based applications either connected or disconnected to the internet in real-time. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
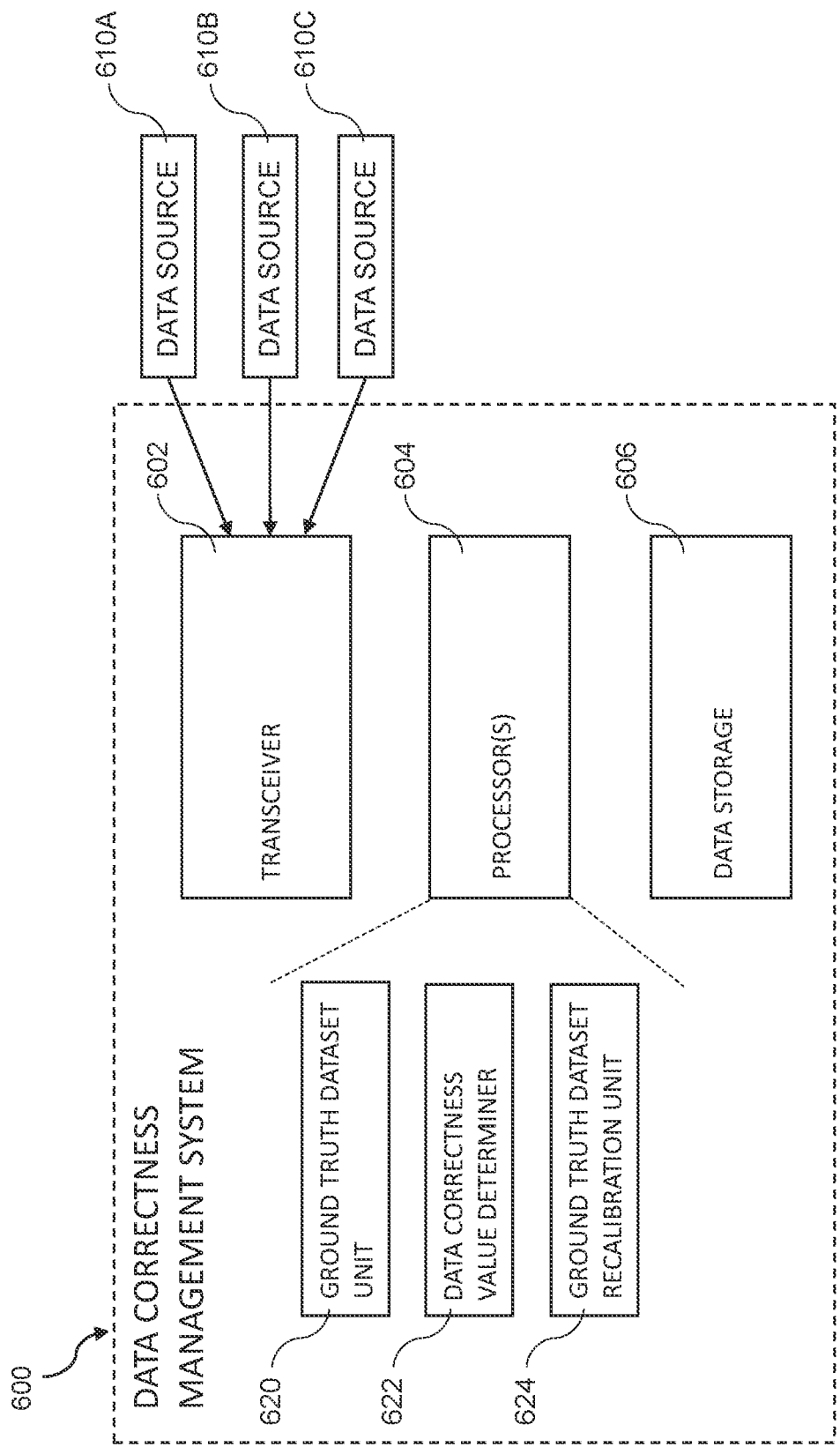
FIG. 6 is a schematic illustration of an exemplarily embodiment of a data correctness management system, according to some embodiments of the present invention.

Referring now to the drawings, FIG. 6 is a schematic illustration of an exemplarily embodiment of a data correctness management system, according to some embodiments of the present invention. An exemplary data correctness management system 600, for example, a computer, a server, a computing node, a cluster of computing nodes, and/or the like may be used for optimizing data correctness using a ground truth dataset and for providing a ground truth dataset to be optimized.

The data correctness management system 600 may include a transceiver 602, a processor(s) 604 and a computer readable medium in form of a data storage 606 for program code store and/or data store.

The transceiver 602 may comprise one or more wired and/or wireless interfaces, for example, a Universal Serial Bus (USB) interface, a serial interface, a Radio Frequency (RF) interface, a Bluetooth interface and/or the like. The transceiver 602 may further include one or more network and/or communication interfaces for connecting to one or more wired and/or wireless networks, for example, a Local Area Network (LAN), a Wireless Local Area Network (WLAN), a Wide Area Network (WAN), a Municipal Area Network (MAN), a cellular network, the internet and/or the like.

The processor(s) 604, homogenous or heterogeneous, may include one or more processors arranged for parallel processing, as clusters and/or as one or more multi core processor(s).

The data storage 606 may include one or more non-transitory storage mediums, such as, for example, an optical storage medium, or a solid-state medium and/or the like supplied together with or as part of other hardware. The data storage 606 may include persistent storage devices, for example, a Read Only Memory (ROM), a Flash array, a hard drive, a solid state drive and/or the like. The data storage 606 may also include one or more volatile devices, for example, Random Access Memory (RAM), cache memory and/or the like. The data storage 606 may further include one or more network storage resources, for example, a storage server, a network accessible storage (NAS), a network drive, a cloud storage and/or the like accessible via the transceiver 602.

The processor(s) 604 may execute one or more software modules such as, for example, a process, a script, an application, an agent, a utility, a tool and/or the like each comprising a plurality of program instructions stored in a non-transitory medium (program store) such as the data storage 606 and executed by one or more processors such as the processor(s) 604. The software module(s) arranged, provided and/or delivered as one or more computer program products may optionally be distributed in other forms, such as via the Internet, Ethernet, or other wired or wireless telecommunication systems.

The processor(s) 604 may further include, integrate and/or utilize one or more hardware modules (elements) integrated and/or utilized by the data correctness management system 600, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU), and/or the like.

The processor(s) 604 may therefore execute one or more functional modules implemented via one or more software modules, hardware modules and/or a combination thereof, for example, a ground truth dataset unit 620, a data correctness value determiner 622 and a ground truth dataset recalibration unit 624.

Via the transceiver 602, the data correctness management system 600, specifically one or more of the functional modules, i.e., the ground truth dataset unit 620, the data correctness value determiner 622 and/or the ground truth dataset recalibration unit 624 may communicate with one or more external devices, systems and/or platforms. For example, via the transceiver 602, the data correctness management system 600 may receive a plurality of datasets from one or more data sources 610, for example, a data source 610A, a data source 610B, and/or a data source 610C. The plurality of datasets may be received from the data sources 610 in one or more data form, for example, files, tables, lists and/or any other suitable data structure form. The transceiver 602 may receive datasets at different points of time. Whenever the transceiver 602 receive a new dataset, the dataset may be stored in the data storage 606. In other embodiments, one or more of the datasets may be temporarily stored until they are processed by the processor(s) 604, specifically by one or more of the functional modules 620, 622 and/or 624.

Moreover, via the transceiver 602, one or more of the functional modules, i.e., the ground truth dataset unit 620, the data correctness value determiner 622 and/or the ground truth dataset recalibration unit 624 may communicate with one or more external sources (not shown) including a panel for determining data correctness values based on one or more methods as known in the art, for example, a panel based method. In other embodiments, other method for determining data correctness value as known in the art may be used, for example, based on calibration measurements.

Optionally, the data correctness management system 600 and/or part thereof, for example, one or more of the functional modules 620, 622 and/or 624 may be implemented as one or more cloud computing services, for example, an Infrastructure as a Service (IaaS), a Platform as a Service (PaaS), a Software as a Service (SaaS) and/or the like deployed over one or more cloud computing platforms.

Optionally, one or more third party client computing devices, such as, for example, a server, a personal computer, a smartphone, a sensor or any internet of things (IoT) device may interact with the data correctness management system 600 over one or more of the networks to which the data correctness management system 600 is connected via the transceiver 602. The third party client may send a request to the data correctness management system 600 to provide a dataset according to the invention. The third party client may also request a subset of the dataset provided according to the invention. The data correctness management system 600 may provide a dataset and/or subset of the dataset corresponding to the request received from the third party client.

Reference is now made to FIG. 1, which is a flowchart of an exemplary process of a first embodiment of a method 100 of providing a ground truth dataset. According to some embodiments, the method 100 may be executed by a data correctness management system such as the data correctness management system 600, specifically by a processor(s) such as the processor(s) 604. In particular, the method 100 may be executed by one or more of the functional modules, for example, the ground truth dataset unit 620.

The ground truth dataset may also be called a "goldset" serving as a reference dataset, according to some embodiments of the present invention. The goldset in this embodiment is provided in order to allow determining data correctness of attribute values in new datasets. Therefore, overlapping data in the goldset and a new dataset can be compared and data correctness values can be assigned to the data of the new dataset based on the overlapping data with the goldset. The goldset can be further improved for data correctness over time in order to allow better predictions of the data correctness of data in the new datasets.

As shown in step 102, the ground truth dataset unit 620 may receive a plurality of datasets from one or more different data sources 610, for example, data sources 610A, 610B and/or 610C. The datasets comprise a plurality of data elements. Each data element includes an identifier in form of a user identifier (user id) and at least one attribute value associated to the user id. The user id uniquely identifies a specific user. In other embodiments the user id can for example be a cookie, an advertising identifier (AdID), or a combination thereof. The data correctness of the attribute values of the datasets provided by the different data sources 610 may vary and may be initially unknown.

In this embodiment, each dataset is provided as a table. Each data element corresponds to a row in the table. A respective user id is included in a cell of the table in a respective first column of a row. Attribute values are included in other cells of the columns of the row. In this embodiment, each row also includes cells for data correctness values associated with respective attribute values and data source identifiers (data source ids) associated with the respective attribute values. In other embodiments, the cells of the table can also be filled in any other manner which allows associating attribute values to a user id and to a respective data source id.

In other embodiments, instead of a table, any other suitable data format may be used for storing the data, such as a columnar format, a document format, or the like.

In this embodiment, the datasets are stored for later processing. In other embodiments, the datasets may also be cached or stored in temporary memory.

As shown in step 104, the ground truth dataset unit 620 may determine data correctness values for the attribute values. A data correctness value is associated with a probability that an attribute value is correct. In this embodiment, the data correctness values are determined by a method for determining a data correctness value known in the prior art, for example, a panel based method. In other embodiments, other methods for determining a data correctness value may be used, e.g., based on calibration measurements.

In this embodiment, random samples may be extracted with replacement from each dataset based on specific criteria, e.g., a number of random samples are extracted with replacement from each dataset which have an attribute value in form of a gender value which is female. Hence, each random sample includes data elements with female gender values only. The samples are provided to a panel for testing whether the female gender values for the respective user ids of the data elements are correct. In this embodiment, the panel is an external data validator. The panel includes a list of selected user ids for which the gender value is known to be female or not female. A data correctness value is determined by comparing the gender value of the user ids of the sample with the panel. If for example, 1000 user ids are included in the sample of which 750 indeed have a female gender value, the data correctness value is determined to be 75%. The data correctness value can be improved by determining the mean value over a number of random samples extracted from the same dataset. For example, when another random sample has a data correctness value of 77%, the mean value of the two random samples can be determined to be 76%. This data correctness value can then be assigned to all attribute values of the same attribute of the dataset. A data correctness value is determined for each attribute by drawing random samples for a respective attribute value of a respective attribute and testing it against a panel with known data correctness values for the respective attribute value.

Since samples are extracted, a data correctness value for an attribute value received from a respective data source 610A, 610B, or 610C may be determined for a subset of data elements received from the respective data source. The data correctness value for the attribute value determined for the subset of the data elements can then be assigned to the attribute values of the same attribute of the other data elements received from the respective data source 610A, 610B, or 610C. This allows to reduce data processing for determining data correctness.

In other embodiments, data correctness values may be included in the datasets received from the data sources 610. In this case the data correctness values are determined by reading them from the datasets. This allows to determine data correctness values without the need of performing a method for determining a data correctness value known in the prior art.

As shown in step 106, the ground truth dataset unit 620 may add a data element with a single data correctness value for each attribute value for each identifier with which a respective attribute value is associated to the ground truth dataset based on the determined data correctness values for the attribute values such that the data correctness values in the ground truth dataset define probability distributions of data correctness for the attribute values. In this embodiment, a data correctness value for a respective attribute value for an identifier with which the respective attribute value is associated corresponds to the single data correctness value. This is the case for each attribute values for each identifier with which a respective attribute value is associated. In this embodiment, the ground truth dataset such includes the data elements of the different datasets and additional columns with data correctness values for the attribute values. Probability distributions of data correctness for an attribute value can be provided based on the column with the data correctness values for the attribute value.

As shown in step 108, the ground truth dataset unit 620 may output the ground truth dataset. The ground truth dataset may be stored, e.g., in the data storage 606. The ground truth dataset unit 620 may provide the data correctness in one or more forms and/or formats. For example, the ground truth dataset unit 620 may output a probability distribution histogram of data correctness for the attribute values of one or more attributes included in the ground truth dataset as shown in FIG. 2 herein after.

The data correctness values may be used by one or more systems, platforms, applications and/or the like to establish, improve and/or determine data correctness of one or more attribute values of one or more data elements included in one or more other datasets received from one or more of the data sources 610. This means that the data correctness established for the attributes included ground truth dataset may be used as basis for establishing and determining the data correctness of corresponding attributes in other datasets.

Figure 2:
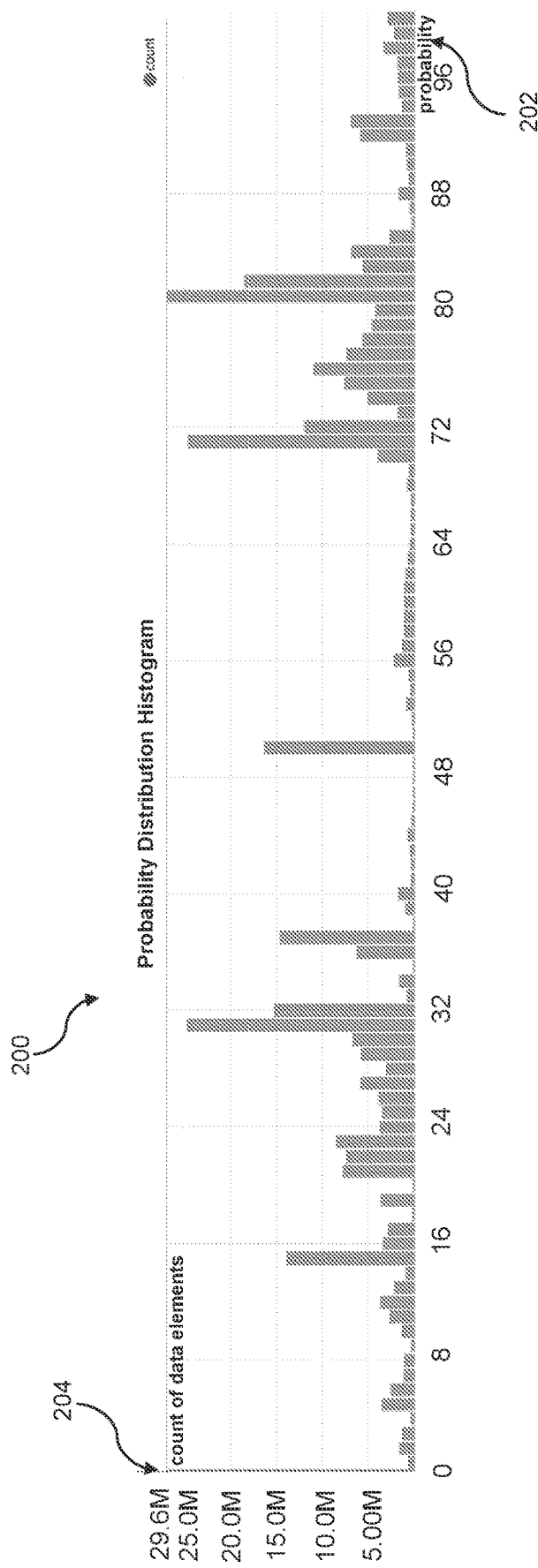
FIG. 2 shows schematically and exemplarily a probability distribution histogram of data correctness for an attribute value, according to some embodiments of the present invention.

Reference is now made to FIG. 2, which is an exemplary probability distribution histogram 200 of data correctness for an exemplary attribute value, according to some embodiments of the present invention. The attribute value is female in this case. The probability distribution 200 shows probability values 202 on the horizontal axis and count 204 of data elements including a respective probability value on the vertical axis. The probability values 202 are added into bins of 1% width. In other embodiments, other bin width may be chosen.

A probability value of 1 corresponds to a probability of 100% that the attribute value associated with a respective user id is female. A probability value of 0 corresponds to a probability of 0% that the attribute value associated with a respective user id is female.

Figure 3:
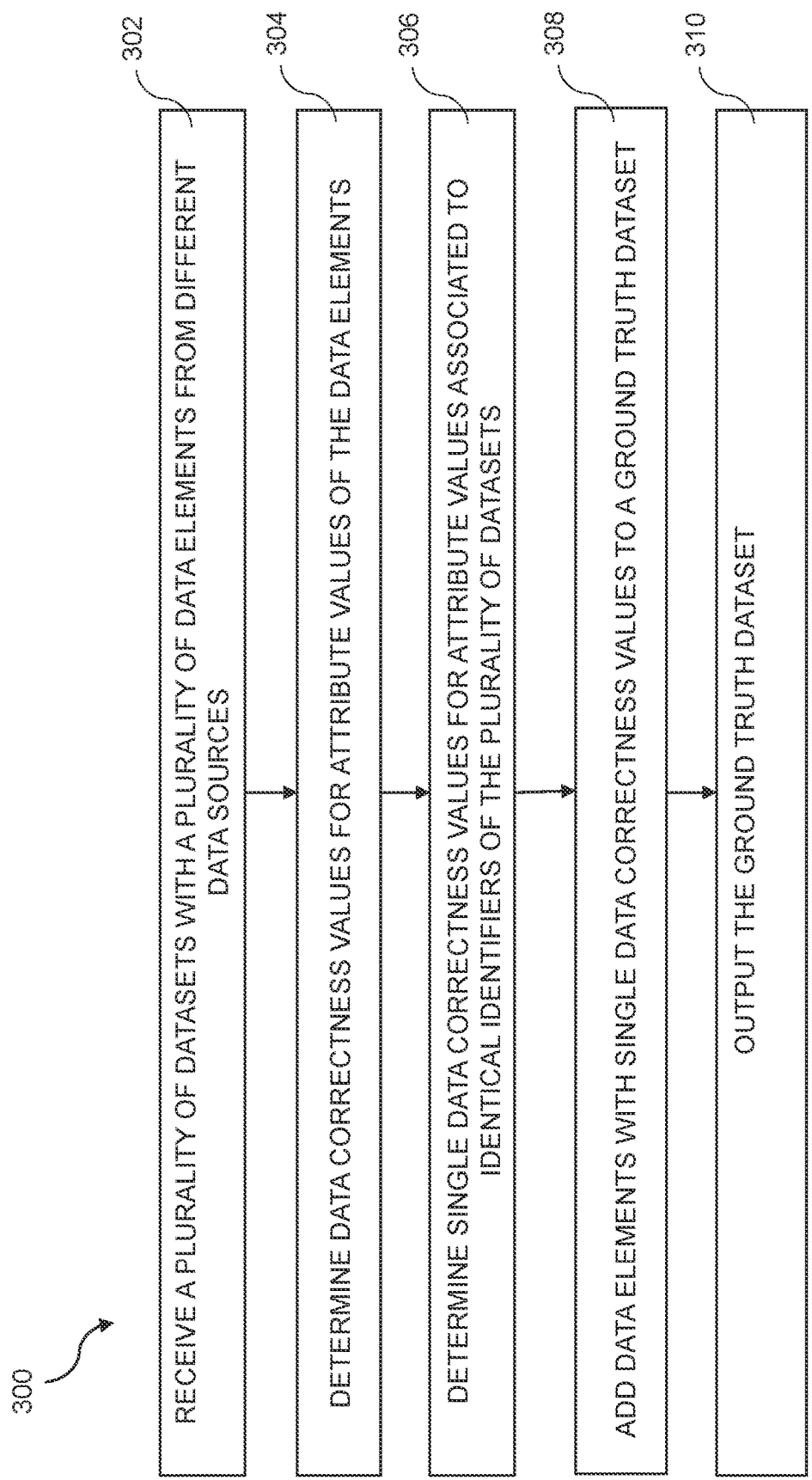
FIG. 3 is a flowchart of an exemplary process of a second embodiment of a method of providing a ground truth dataset, according to some embodiments of the present invention.

Reference is now made to FIG. 3, which is a flowchart of an exemplary process of a second embodiment of a method 300 of providing a ground truth dataset, according to some embodiments of the present invention. The method 300 is very similar to method 100 where steps 302, 304, 308, and 310 are identical to steps 102, 104, 106, and 108 respectively. Additionally, the method 300 includes an additional step 306.

According to some embodiments, the process 300 may be executed by a data correctness management system such as the data correctness management system 600, specifically by a processor(s) such as the processor(s) 604. In particular, the process 300 may be executed by one or more of the functional modules, for example, the ground truth dataset unit 620.

As shown in step 302, which is similar to step 102, the ground truth dataset unit 620 may receive a plurality of datasets from one or more different data sources 610, for example, data sources 610A, 610B and/or 610C.

As shown in step 304, which is similar to step 104, the ground truth dataset unit 620 may determine data correctness values for the attribute values.

As shown in step 306, the ground truth dataset unit 620 may determine a single data correctness value for an attribute value associated with identical identifiers in the plurality of received data sets. In this embodiment, the identical identifiers are user ids. Hence, if the plurality of datasets includes two or more data elements with an identical user id and an identical attribute, a single data correctness value can be determined based on the data correctness values for the attribute value of the user id.

The attribute can for example be gender. Gender values can for example be male and female. In other embodiments, diverse or other may also be a gender value. If there are only two gender values, knowing the data correctness of one of the values allows to determine the data correctness value for the other value. For example, if the data correctness value of male is 70%, the data correctness value of female would be 30%.

In case that the attribute values in the plurality of datasets were received from different data sources, the ground truth dataset unit 620 may determine the single data correctness value by calculating $$p = \frac{\prod_i^n p_i}{\prod_i^n p_i + \prod_i^n (1 - p_i)}$$

wherein p is the single data correctness value, n is a number of different data sources, and $p_i$ is a probability for the attribute value received from data source i to be correct.

For example, if two data elements with gender value are in the received plurality of datasets for the same user id, the ground truth dataset unit 620 may calculate the single data correctness value by:

$$p = \frac{p_1 \cdot p_2}{p_1 \cdot p_2 + (1-p_1) \cdot (1-p_2)}$$

wherein $p_1$ is the probability of the gender value received from a first data source to be correct and $p_2$ is the probability of the gender value received from the second data source to be correct. If the received plurality of datasets includes a data correctness value $p_1$ from the first data source for a female gender value with 70% and a data correctness value $p_2$ from the second data source for a female gender value with 70%, this results in an increased single data correctness value of 84.5%.

In another example case, the single data correctness value may also be reduced compared to one of the data correctness values, e.g., if one of the data correctness values is below 50%. In this case, for example, a data correctness value $p_1$ from the first data source for a female gender value may be 70% and a data correctness value $p_{m,2}$ from the second data source for a male gender value may be 70%. The first data source provided a female gender value and the second data source provided a male gender value in this case. The data correctness value $p_2$ from the second data source for a female gender value can be determined to be 30% by calculating $1-p_{m,2}$, if only two gender values are available. Using the above formula for determining the single data correctness value, this results in a reduced single data correctness value of 50%. In other embodiments, in which more than two different attribute values are available, the attribute values have either to be identical or a sufficient number, i.e., n−1 attribute values of n possible attribute values need to be known in order to determine an unknown attribute value.

In case that the attribute values included in one or more of the datasets were received from the same data source, the ground truth dataset unit 620 may determine the mean value of the data correctness values by calculating $$p_i = \frac{\sum_{j}^{k} p_{ij}}{k}$$

wherein $p_i$ is the mean probability for the attribute value received from the data source i to be correct, k is a number of probabilities for the attribute value of the data element received from the data source i to be correct, and $p_{ij}$ is a j-th probability for the attribute value of the data element of the data source i to be correct.

For example, if two data correctness values $p_1$ and $p_2$ are included in the received plurality of datasets with $p_1=70\%$ and $p_2=70\%$, k is 2 and the mean value is 70%. In case that $p_1=70\%$ and $p_2=30\%$, the mean value is 50%.

If the plurality of datasets includes data correctness values of a respective attribute value of an identical identifier from the same data source and from different data sources, in a first step, the ground truth dataset unit 620 may determine mean values of the data correctness values for the data correctness values from the same data sources. In a second step, the ground truth dataset unit 620 may determine the single data correctness value for the respective attribute value for the respective identifier using the formula for calculating the single data correctness value in the case that the attribute value in the plurality of datasets were received from different data sources.

If all data correctness values of a respective attribute value of a respective identifier are from the same data source, the mean value of the data correctness values corresponds to the single data correctness value.

The step 306 may be performed for all attribute values associated with identical user ids in order to provide data elements for all cases in which two or more data elements are included in the plurality of datasets which have an identical user id and either an identical attribute value or a sufficient number of data correctness values for other attribute values that allows to determine a data correctness value for the identical attribute value.

As shown in step 308, the ground truth dataset unit 620 may add a data element with a single data correctness value for each attribute value for each user id with which a respective attribute value is associated to the ground truth dataset such that the data correctness values in the ground truth dataset define probability distributions of data correctness for the attribute values.

In this embodiment, the steps 306 and 308 may be performed based on an event trigger, namely, when a user selects to generate a ground truth dataset. In other embodiments, other event triggers may be used in order to perform steps 306 and 308, e.g., based on a change of data volume of the received datasets, based on a time trigger, such as after two month or every two months, a combination thereof, or whenever one of multiple event triggers is triggered.

As shown in step 310, which is similar to step 108, the ground truth dataset unit 620 may output the ground truth dataset. The ground truth dataset may for example be stored in data storage 606. For example, the ground truth dataset unit 620 may output a probability distribution histogram of data correctness for the attribute values of one or more attributes included in the ground truth dataset as shown in FIG. 2.

Figure 4A:
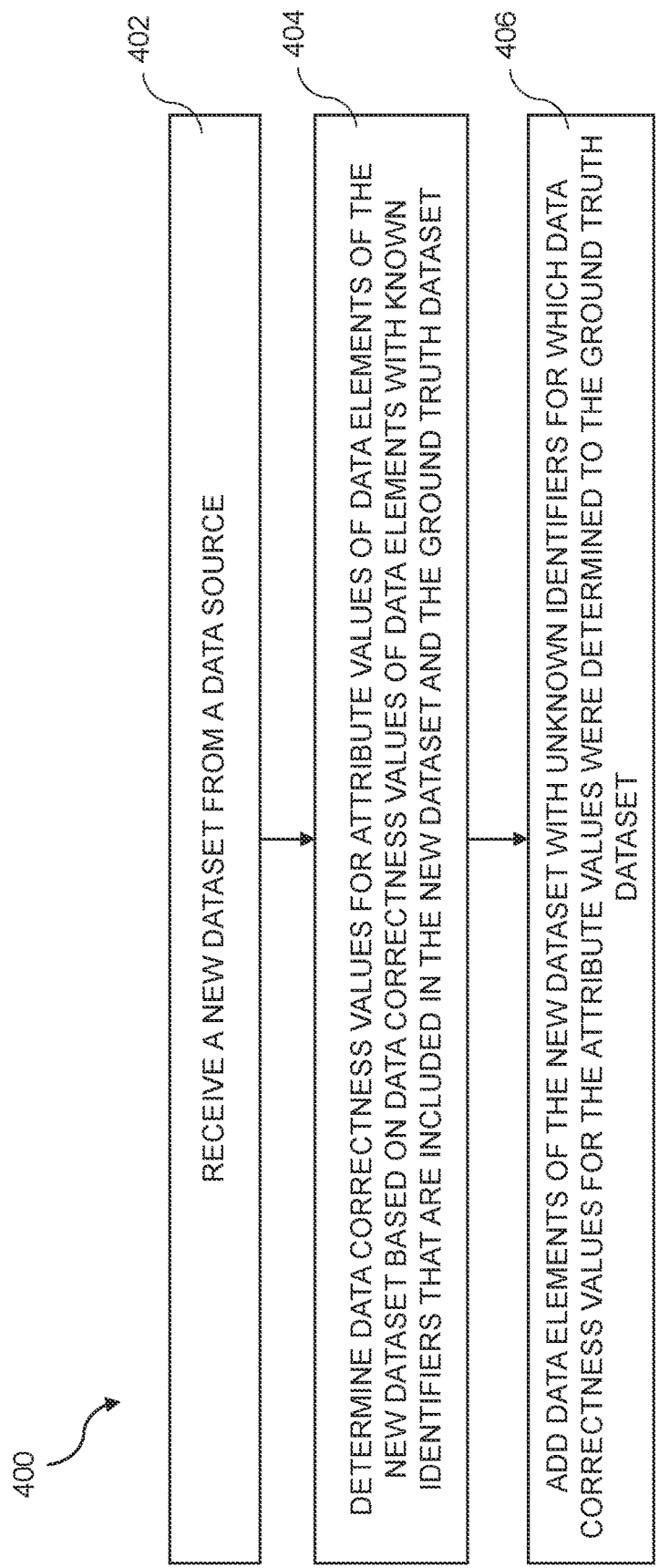
FIG. 4A, FIG. 4B and FIG. 4C are flowcharts of an exemplary process of a first embodiment of a method of optimizing data correctness, according to some embodiments of the present invention.
Figure 4B:
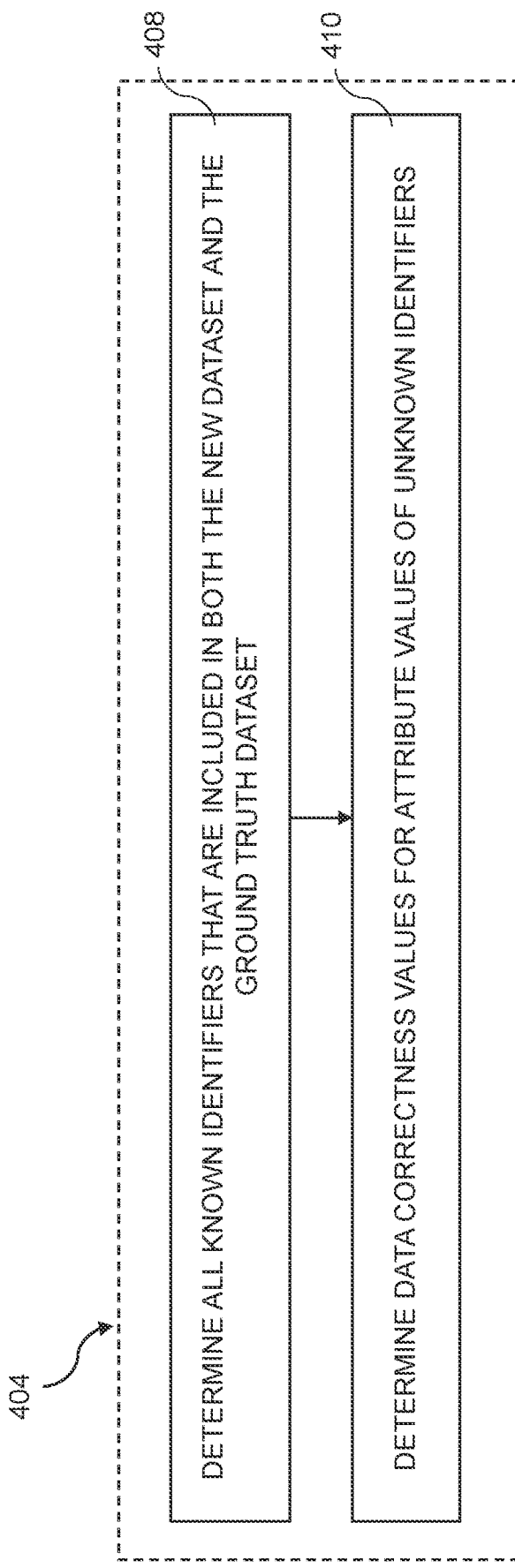
Figure 4C:
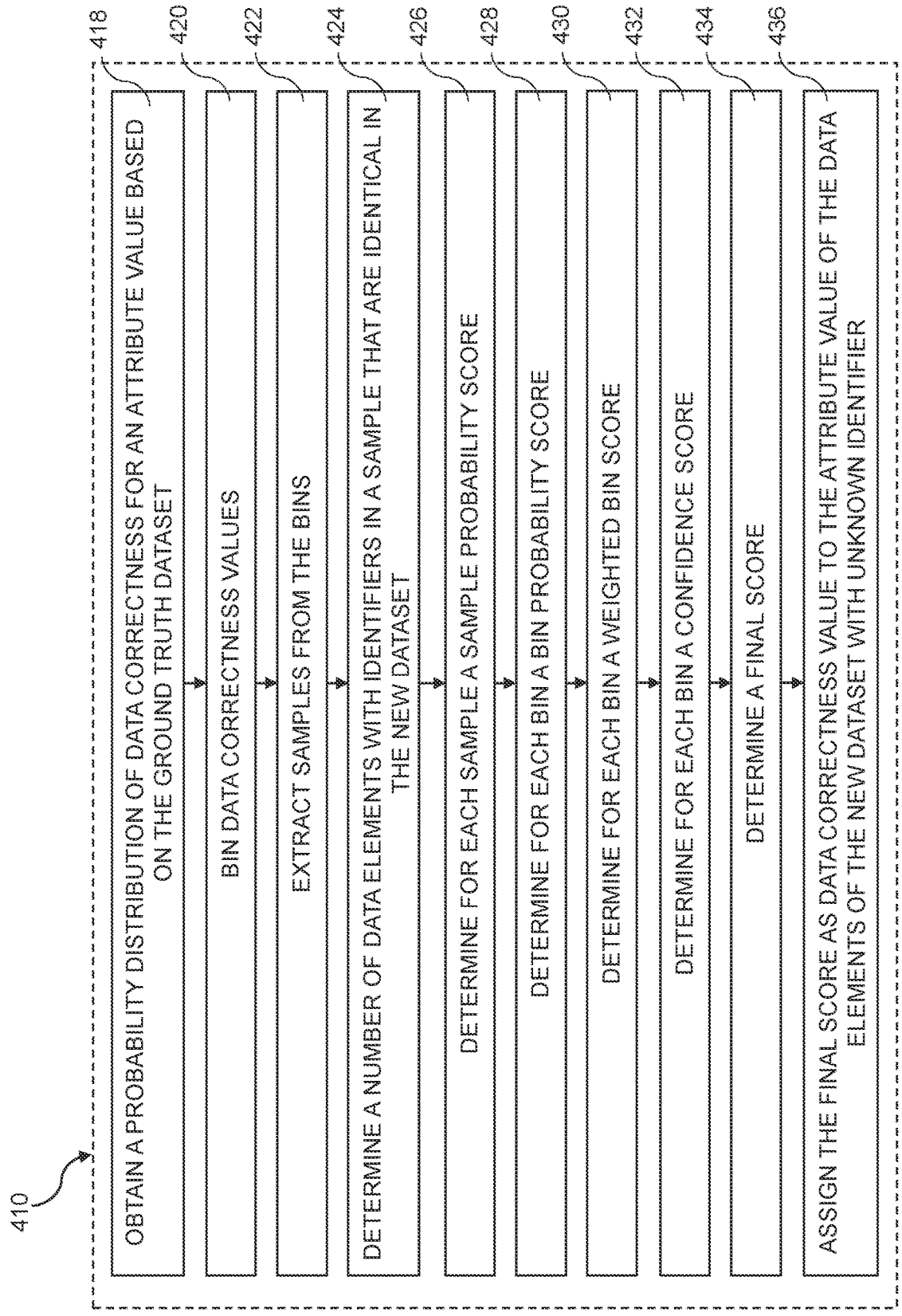

Reference is now made to FIG. 4A, FIG. 4B and FIG. 4C, which are flowcharts of an exemplary process of a first embodiment of a method 400 of optimizing data correctness using a ground truth dataset, according to some embodiments of the present invention. According to some embodiments, the method 400 may be executed by a data correctness management system such as the data correctness management system 600, specifically by a processor(s) such as the processor(s) 604. In particular, the method 400 may be executed by one or more of the functional modules, for example, the data correctness value determiner 622.

The data correctness value determiner 622 may receive, fetch, be provided with and/or otherwise obtain the ground truth dataset, for example, from the ground truth dataset unit 620 executing the method 100 and/or the method 300.

As shown in step 402, the data correctness value determiner 622 may receive a new dataset from a data source such as from one of the data sources 610. The new dataset comprises a plurality of data elements. Each data element includes an identifier in form of a user id and at least one attribute value associated with the user id.

As shown in step 404, the data correctness value determiner 622 may determine data correctness values for the attribute values of the data elements of the new dataset based on the data correctness values for the attribute values of the data elements with known identifiers of the ground truth dataset. A known identifier is an identifier which is included in the ground truth dataset and in the new dataset. In this embodiment a known identifier is a known user id.

The step 404 includes substeps 408 and 410 as shown in FIG. 4B.

As shown in step 408, the data correctness value determiner 622 may determine the known identifiers that are included in both the new dataset and the ground truth dataset. To this end, the data correctness value determiner 622 may compare the user ids included in the new dataset with the ones of the ground truth dataset in order to determine, which of the user ids of the new dataset are already known in the ground truth dataset. User ids which are included in the new dataset, but not in the ground truth dataset are unknown identifiers.

Optionally, the data correctness value determiner 622 may determine whether the new dataset comprises a number of data elements including a known identifier which exceeds a certain threshold level in form of a threshold number. In this embodiment the threshold number may be, for example, 50000. In other embodiments, any other number may be chosen. In this embodiment, the data correctness value determiner 622 may perform steps 410 and 406 only in case the number of data elements including known identifiers is above the threshold number. If the new dataset does not comprise a number of data elements with known identifier above the threshold number, the data correctness value determiner 622 may determine data correctness values for the new dataset using a panel based method for determining a data correctness value for an attribute value.

In other embodiments, another method known in the prior art for determining a data correctness value can be used, e.g., based on calibration measurements, or the new dataset can be discarded. The threshold level may be, for example, a threshold ratio, such as at least 8%, 10%, or 20% of the data elements of the new dataset having a known identifier.

As shown in step 410, the data correctness value determiner 622 may determine data correctness values for attribute values of data elements of the new dataset with unknown identifier. The data correctness value determiner 622 may determine data correctness value for a respective attribute value of the data elements of the new dataset with unknown identifier based on a probability distribution of data correctness for the respective attribute value. Data correctness values are determined for each attribute value of the data elements with unknown identifier included in the new dataset in step 410.

In other embodiments, the data correctness value determiner 622 may determine only a subset of data correctness values. The data correctness value determiner 622 may assign data correctness values for other attribute values based on the data correctness values determined for the subset. Moreover, the data correctness value determiner 622 may remove one or more of the attribute values for which no data correctness value has been determined. For example, if there is an insufficient number of data elements with known identifiers for a certain attribute value, the attribute value may be removed.

The step 410 comprises a plurality of substeps 418 to 436 as shown in FIG. 4C.

As shown in step 418, the data correctness value determiner 622 may receive and/or obtain a probability distribution of data correctness for the respective attribute value based on the ground truth dataset. An exemplary probability distribution is shown in FIG. 2. For example, the data correctness value determiner 622 may receive, fetch, be provided with and/or otherwise obtain the probability distribution of data correctness from the ground truth dataset unit 620 executing the method 100 and/or the method 300.

As shown in step 420, the data correctness value determiner 622 may bin data correctness values of the probability distribution of data correctness for the respective attribute value such that each bin includes data elements of the ground truth dataset with data correctness values for the respective attribute value within a range of data correctness values for the respective attribute value. In this embodiment, the dataset is divided into N bins with each bin having a width of data correctness values. The width in this embodiment is 1%, i.e., 0 to below 0.01 for the first bin of 1%, 0.01 to below 0.02 for the second bin of 2%, and so forth. Therefore, the number of bins is 100 in this embodiment. In other embodiments a different number of bins may be chosen and a different width of data correctness values for the binning of the data correctness values, e.g., a width of 5% resulting in 20 bins. Each of the bins of the probability distribution includes a number of user ids. In the exemplary probability distribution of FIG. 2, for example a bin with data correctness values of about 81%, i.e., including data correctness values from 80.0% to below 81.0%, includes 26.9 million user ids.

As shown in step 422, the data correctness value determiner 622 may extract from each bin a number of samples each including a number of data elements. For example, the data correctness value determiner 622 may extract 20 random samples with replacement for each bin. In other embodiments, the data correctness value determiner 622 may extract a different number of samples, for example, 5, 10, 50, or 100. Also one or more other sampling methods may be used. The number of data elements extracted is 50000 in this exemplary embodiment. In other embodiments a different number of data elements may be extracted, for example, as 10000, 20000, or 100000. The number of data elements may be determined, for example, based on the number of data elements in the bins. For example, the number of data elements can correspond to the number of data elements in the bin with the fewest data elements.

As shown in step 424, the data correctness value determiner 622 may determine a number of data elements with identifiers in a respective sample which are identical to identifiers in the new dataset for each sample. Therefore, the user ids in the sample are compared to the user ids in the new dataset and the number of intersects or overlaps are determined.

The data correctness value determiner 622 may discard one or more samples in case the number of data elements with identifiers in the respective sample which are identical to identifiers in the new dataset is below a certain threshold identifier number. In this embodiment, the threshold identifier number may be, for example, 5000. In other embodiments, other threshold identifier numbers may be chosen, such as 1000, 2000, or 10000. The threshold identifier number may also be dependent on the sample size and can be, for example, a ratio of known identifiers compared to a total number of identifiers in the sample, such as, for example, 8%, 10%, or 20%.

The data correctness value determiner 622 may further process one or more samples in case the number of data elements with identifiers in the respective sample which are identical to identifiers in the new dataset is equal to or above the threshold identifier number.

As shown in step 426, the data correctness value determiner 622 may determine a sample probability score based on the data correctness values for the respective attribute value of the data elements with identical identifiers in the ground truth dataset and the new dataset for each sample. In this embodiment, the data correctness value determiner 622 may determine the sample probability score by calculating a mean data correctness value of the data correctness values in a respective sample.

As shown in step 428, the data correctness value determiner 622 may determine a bin probability score of a respective bin based on the sample probability scores of the respective bin. The data correctness value determiner 622 may determine a bin probability score for each bin. In this embodiment, the data correctness value determiner 622 may determine the bin probability score by calculating the median of the mean data correctness values of the samples in the bin.

As shown in step 430, the data correctness value determiner 622 may determine a weighted bin score by multiplying a respective bin probability score with a respective number of data elements with identifiers in the respective bin which are identical to identifiers in the new dataset. The data correctness value determiner 622 may determine a weighted bin score for each bin.

As shown in step 432, the data correctness value determiner 622 may determine a confidence score based on the respective weighted bin score and the respective number of data elements with identifiers in the respective bin which are identical to identifiers in the new dataset. In this embodiment, the confidence score corresponds to the lower confidence score. The data correctness value determiner 622 may determine a confidence score for each bin. In this embodiment, the data correctness value determiner 622 may determine the confidence score in form of a Wilson confidence score based on Wilson confidence interval. In other embodiments, the data correctness value determiner 622 may determine other confidence scores based on one or more other confidence intervals, e.g., Wilson score interval with continuity correction, Jeffreys interval, Clopper-Pearson interval, Agresti-Coull interval, normal approximation interval, or any other binomial proportion confidence interval.

As shown in step 434, the data correctness value determiner 622 may determine a final score by dividing a sum of the confidence scores by a sum of the number of data elements with identifiers in the bins which are identical to identifiers in the new dataset.

As shown in step 436, the data correctness value determiner 622 may assign the final score as data correctness value to the attribute value of the data elements of the new dataset with unknown identifier.

The final score assigned, by the data correctness value determiner 622, to the attribute value may reflect a modified average data correctness value of the data correctness values for the attribute value of the data elements with known identifiers in the ground truth dataset. To modify the average data correctness value, to arrive at the final score, and in order to allow to express a confidence in that score, the number of data elements of the ground truth dataset that have identifiers which are identical to identifiers in the new dataset, i.e. the number of intersects, is important. The intersects are accounted for by using confidence intervals.

The probability distribution is a binomial distribution, i.e., either the attribute value is identical or not with a certain probability which corresponds to the data correctness value. The confidence interval is therefore defined over a binomial proportion. In this embodiment, Wilson confidence interval is chosen, as its coverage probability is closer to nominal value.

The final score allows to account for asymmetric volume or skewness of information. The ground truth dataset may contain skewed information such that an average data correctness value would tend to favour the skew. In other words, the skewed information dominates and would shift the average data correctness value based on the skewed information. This results, as the probability distribution is skewed, as can be seen in the exemplary probability distribution of FIG. 2. Therefore, if an average data correctness value would be calculated a majority of intersects would occur for data correctness values where a large amount of user ids is included in the ground truth dataset. The other data correctness values would therefore contribute significantly less. The substeps 418 to 436 of step 410 may allow to overcome this problem and to modify the average data correctness value.

As shown in step 406, the data correctness value determiner 622 may add the data elements of the new dataset with unknown identifier for which the data correctness values for the attribute values were determined to the ground truth dataset. This allows to optimize the data correctness of the ground truth dataset.

Figure 5A:
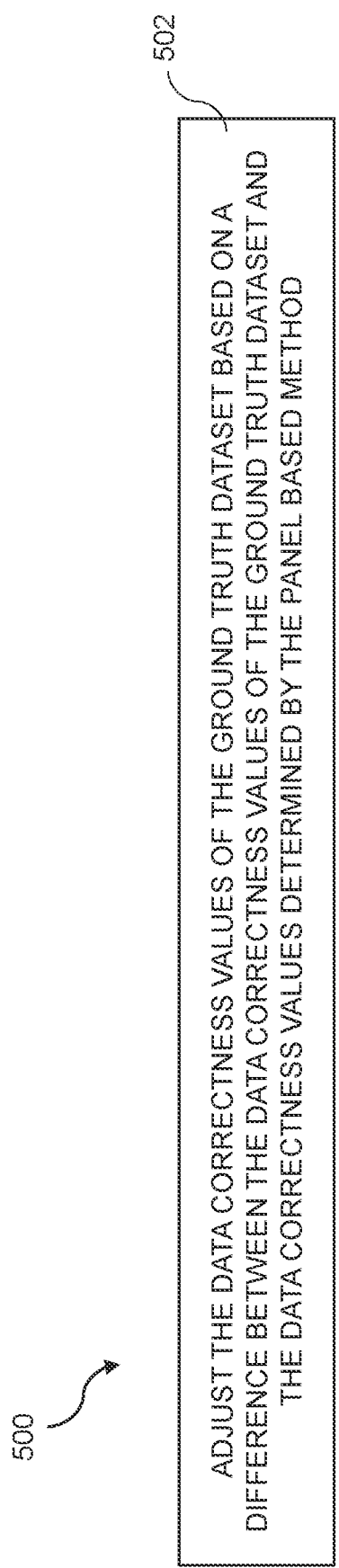
FIG. 5A and FIG. 5B are flowcharts of an exemplary process of a second embodiment of a method of optimizing data correctness, according to some embodiments of the present invention.
Figure 5B:
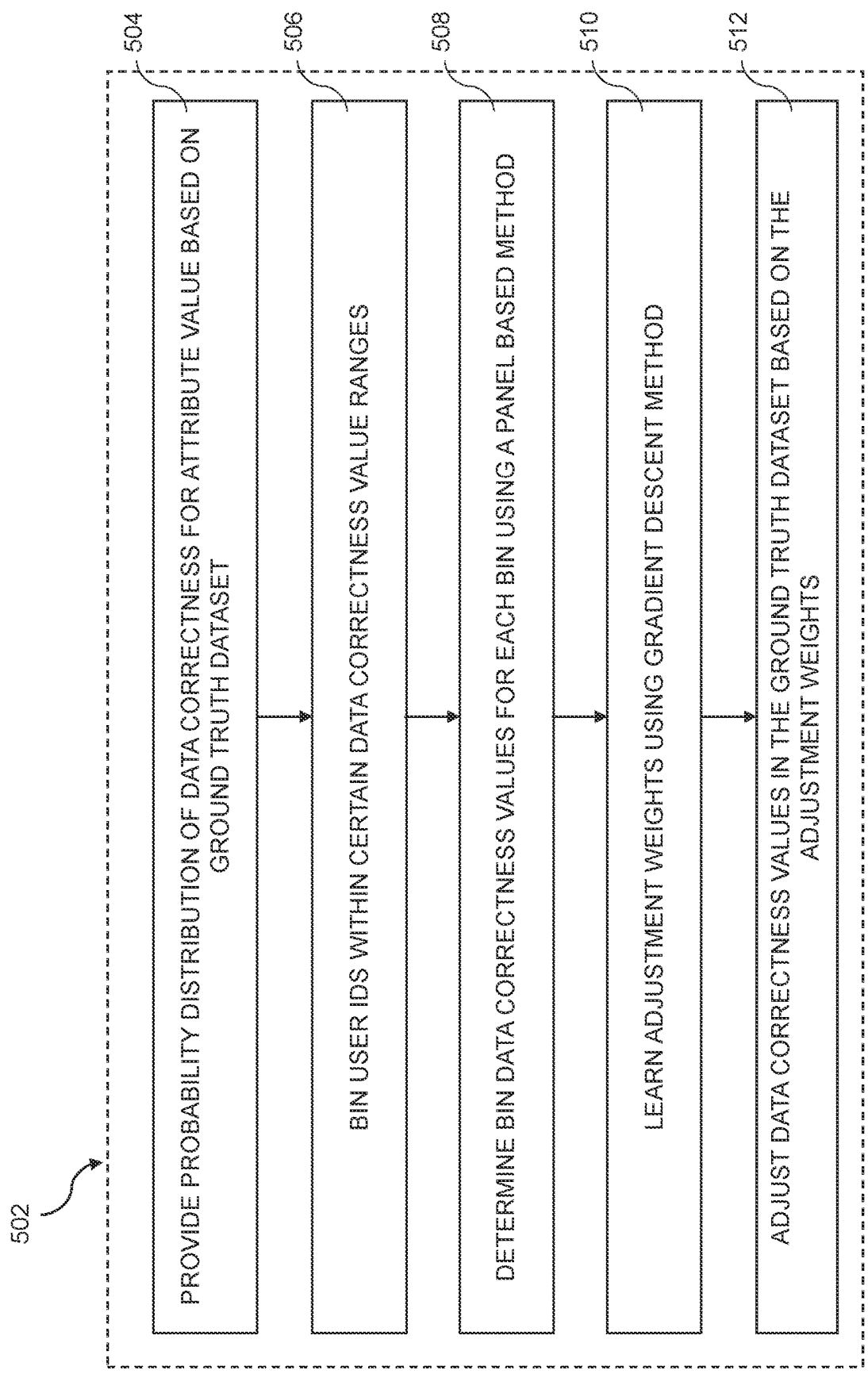

Reference is now made to FIGS. 5A and 5B, which are flowcharts of an exemplary process of a second embodiment of a method 500 of optimizing data correctness using a ground truth dataset, according to some embodiments of the present invention. According to some embodiments, the process 500 may be executed by a data correctness management system such as the data correctness management system 600, specifically by a processor(s) such as the processor(s) 604. In particular, the process 500 may be executed by one or more of the functional modules, for example, the ground truth dataset recalibration unit 624.

The ground truth dataset may be provided, for example, by the method 100, the method 300 and/or the method 400.

Over time, the data correctness values in the ground truth dataset may deviate from true data correctness values. The ground truth dataset recalibration unit 624 may therefore execute the method 500 to recalibrate the ground truth dataset and/or part thereof.

In this embodiment, the ground truth dataset recalibration unit 624 may compare the data correctness values for a respective attribute value of respective data elements of the ground truth dataset to data correctness values for the respective attribute value of the respective data elements determined by a method for determining a data correctness value known in the prior art in dependence of a triggering event. The difference between the data correctness values can be used for determining whether the data correctness values in the ground truth dataset are still reliable.

In other words, the ground truth dataset recalibration unit 624 may recalibrate the data correctness values for the attribute values in the ground truth dataset based on a trigger event, for example, in certain time intervals. Recalibration is performed based on determining data correctness values for the attribute values by a method known in the art, for example, the panel based method for determining a data correctness value, and comparing the data correctness values in the ground truth dataset with the ones determined using the panel based method. In other embodiments, one or more other trigger events may be defined and used for triggering the recalibration process. Furthermore, one or more other methods as known in the art may be used for determining a data correctness value, for example, based on calibration measurements.

As shown in step 502, the ground truth dataset recalibration unit 624 may adjust the data correctness values for the respective attribute value of the respective data elements of the ground truth dataset based on a difference between the data correctness values for the respective attribute value of the respective data elements of the ground truth dataset and the data correctness values for the respective attribute value of the respective data elements determined by the method for determining a data correctness value known in the prior art, namely in this embodiment the panel based method.

The step 502 comprises a plurality of substeps 504 to 512 shown in FIG. 5B.

The ground truth dataset recalibration unit 624 may perform the step 502 for a plurality, such as all, of data correctness values for a plurality, such as all, of attribute values in the ground truth dataset.

As shown in step 504, the ground truth dataset recalibration unit 624 may obtain and/or provide a probability distribution of data correctness for the respective attribute value based on the ground truth dataset.

As shown in step 506, the ground truth dataset recalibration unit 624 may bin data correctness values of the probability distribution of data correctness for the respective attribute value such that each bin includes data elements of the ground truth dataset with data correctness values for the respective attribute value within a range of data correctness values for the respective attribute value. Hence, data elements of the ground truth dataset with user ids associated with the attribute value and with a data correctness value within a certain range are included in a bin. In this embodiment, each bin may include a range of 10%, e.g., a first bin includes 0% to below 10%, a second bin includes 10% to below 20%, and so forth. In other embodiments, each bin can also include a range of between 1% to 20%, such as 1%, 5% or 20%.

As shown in step 508, the ground truth dataset recalibration unit 624 may determine a bin data correctness value by the panel based method for determining a data correctness value for each bin. In other embodiments any other method for determining a data correctness value known in the prior art can be used, e.g., based on calibration measurements. In this embodiment, the ground truth dataset recalibration unit 624 may extract a random sample from a respective bin and a bin data correctness value for the attribute value may be determined for the user ids in the sample using the panel based method. The ground truth dataset recalibration unit 624 may compare bin data correctness values for the bins as determined by the panel based method to the data correctness values for the attribute value of the ground truth dataset.

This allows to reduce costs as for each bin a bin data correctness value can be determined by a method for determining a data correctness value known in the prior art based on a subset of data elements selected from the respective bin.

As shown in step 510, the ground truth dataset recalibration unit 624 may learn an adjustment weight for the data correctness values for the respective attribute value for the data elements for each bin based on minimizing a difference between a median data correctness value for the respective bin determined based on the data correctness values for the respective attribute value in a respective bin weighted based on a current adjustment weight and the bin data correctness value.

In this embodiment, the ground truth dataset recalibration unit 624 may apply a gradient descent method for learning an adjustment weight for a respective bin. The gradient descent method applied by the ground truth dataset recalibration unit 624 may comprise the following substeps:

providing an initial adjustment weight, for example, 0.5 as current adjustment weight, and repeating the following substeps until a RMSE between the median data correctness value for the respective bin and the bin data correctness value for the respective bin is below a recalibration threshold value, e.g., 0.5% or any other recalibration threshold value:

determining the median data correctness value for the respective bin by first calculating $$p_{l+1} = \frac{p_l \cdot w}{p_l \cdot w + (1-p_l) \cdot (1-w)}$$

for each single data correctness value in the respective bin, with $p_{l+1}$ the adjusted single data correctness value, $p_l$ the current single data correctness value, and w the respective adjustment weight for the bin and then finding a median adjusted single data correctness value of the respective bin, determining the RMSE between the median data correctness value for the respective bin and the bin data correctness value, determining a gradient of the RMSE loss with respect to the adjustment weight, and adjusting the adjustment weight based on the current adjustment weight, a learning rate, and the gradient, namely $w_{i+1}=w_i-$learningrate$\cdot$gradient, with $w_{i+1}$ the adjusted adjustment weight and $w_i$ the adjustment weight of the current iteration step.

The ground truth dataset recalibration unit 624 may apply the gradient descent method for a plurality of bins and optionally for all bins. In other embodiments, the substeps may be repeated until one or more other convergence conditions are fulfilled, for example, a certain number of iteration has been performed and/or the like.

In other embodiments, learning of an adjustment weight can also be performed based on one or more other machine learning methods, e.g., including a linear classifier, backpropagation, and gradient descent methods or using neural networks. For example, the ground truth dataset recalibration unit 624 may learn the adjustment weights by minimizing an error between the data correctness values in the bins of the ground truth dataset compared to the data correctness values determined by the panel based method.

In other embodiments, the ground truth dataset recalibration unit 624 may apply one or more other methods for optimizing the adjustment weights by minimizing an error between the data correctness values in the ground truth dataset and the data correctness values determined by the panel based method.

As shown in step 512, the ground truth dataset recalibration unit 624 may adjust the data correctness value for the respective attribute value in the ground truth dataset based on the respective adjustment weight for each data element.

According to some embodiments, adjusting, for each data element, the data correctness value for the respective attribute value in the ground truth dataset based on the respective adjustment weight may include calculating an adjusted single data correctness value for the attribute values for the identifiers using $$p_{l+1} = \frac{p_l \cdot w}{p_l \cdot w + (1-p_l) \cdot (1-w)}.$$

The ground truth dataset recalibration unit 624 may use different panels, e.g., different external sources for the recalibration. This may result in different adjustment weights and different adjusted data correctness values. Preferably, an external source with a highest confidence for a respective attribute is used for recalibrating the ground truth dataset.

Exemplary embodiments of the invention have been illustrated and described in details in the drawings and foregoing description. The invention may also for example be operated in an embodiment wherein the methods and the data correctness management system are directed to targeted providing of information, such as health information or warning. Health information or warning may for example be provided to users based on a health information, such as a health condition. The invention may also for example be operated in an embodiment wherein the methods and the data correctness management system are directed to forecasting, such as climate forecasting, weather forecasting, traffic forecasting, or energy demand and supply forecasting.

A single unit of the data correctness management system may perform several steps of the method recited in the claims. The mere fact that certain measures are recited in mutually different dependent claims does not indicate that a combination of these measures cannot be used to advantage.

Method steps like receiving a plurality of datasets from different data sources, determining data correctness values for the attribute values, adding a data element with a single data correctness value for each attribute value for each identifier with which a respective attribute value is associated to the ground truth dataset based on the determined data correctness values for the attribute values such that the data correctness values in the ground truth dataset define probability distributions of data correctness for the attribute values, outputting the ground truth dataset, the ground truth dataset is used to determine data correctness of attribute values included in at least one new dataset, receiving a new dataset from a data source, determining data correctness values for the attribute values of the data elements of the new dataset based on the data correctness values for the attribute values of the data elements with known identifiers of the ground truth dataset, obtaining the probability distribution of data correctness for the respective attribute value based on the ground truth dataset, binning of data correctness values of the probability distribution of data correctness for the respective attribute value, such that each bin includes data elements of the ground truth dataset with data correctness values for the respective attribute value within a range of data correctness values for the respective attribute value, extracting from each bin a number of samples each including a number of data elements, determining for each sample a number of data elements with identifiers in a respective sample which are identical to identifiers in the new dataset, determining for each sample a sample probability score based on the data correctness values for the respective attribute value of the data elements with identical identifiers in the ground truth dataset and the new dataset, determining for each bin a bin probability score of a respective bin based on the sample probability scores of the respective bin, determining for each bin a weighted bin score by multiplying a respective bin probability score with a respective number of data elements with identifiers in the respective bin which are identical to identifiers in the new dataset, determining for each bin a confidence score based on a respective weighted bin score and the respective number of data elements with identifiers in the respective bin which are identical to identifiers in the new dataset, determining a final score by dividing a sum of the confidence scores by a sum of the number of data elements with identifiers in the bins which are identical to identifiers in the new dataset, assigning the final score as data correctness value to the attribute value of the data elements of the new dataset with unknown identifier, adding the data elements of the new dataset with unknown identifier for which the data correctness values for the attribute values were determined, to the ground truth dataset, adjusting the data correctness values for the respective attribute value of respective data elements of the ground truth dataset based on a difference between the data correctness values for the respective attribute value of the respective data elements of the ground truth dataset and the data correctness values for the respective attribute value of the respective data elements determined by a method for determining a data correctness value known in the prior art, obtaining a probability distribution of data correctness for the respective attribute value based on the ground truth dataset, binning of data correctness values of the probability distribution of data correctness for the respective attribute value, such that each bin includes data elements of the ground truth dataset with data correctness values for the respective attribute value within a range of data correctness values for the respective attribute value, determining for each bin a bin data correctness value for the respective attribute value by a method for determining a data correctness value known in the prior art, learning an adjustment weight for the data correctness values for the respective attribute value for the data elements for each bin based on minimizing a difference between a median data correctness value for the respective bin determined based on the data correctness values for the respective attribute value in a respective bin weighted based on a current adjustment weight and the bin data correctness value for the respective bin, adjusting for each data element the data correctness value for the respective attribute value in the ground truth dataset based on the respective adjustment weight, et cetera performed by one or several units can be performed by any other number of units. These method steps and/or the method can be implemented as program code means of a computer program product and/or as dedicated hardware.

The present invention relates to providing a ground truth dataset and optimizing data correctness using the ground truth dataset. A plurality of datasets is received from different data sources. The datasets comprise a plurality of data elements. Each data element includes an identifier and at least one attribute value associated with the identifier. Data correctness values are determined for the attribute values. A data correctness value is associated with a probability that an attribute value is correct. A data element with a single data correctness value is added to the ground truth dataset for each attribute value for each identifier with which a respective attribute value is associated based on the determined data correctness values for the attribute values such that the data correctness values in the ground truth dataset define probability distributions of data correctness for the attribute values. A new dataset can be received from a data source with the new dataset comprising a plurality of data elements and each data element including an identifier and at least one attribute value associated with the identifier. Data correctness values for the attribute values of the data elements of the new dataset can be determined based on the data correctness values for the attribute values of the data elements with known identifiers of the ground truth dataset. A known identifier is an identifier which is included in the ground truth dataset and in the new dataset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A computer implemented method for improving data correctness of measured values using a ground truth dataset, comprising:

using a transceiver and at least one processor coupled to the transceiver for:

receiving a plurality of datasets from different data sources, the datasets comprising a plurality of data elements, wherein each data element includes an identifier and at least one measured value associated with the identifier;

determining data correctness values for the measured values using at least one of a panel and calibration measurements for checking correctness of the measured values, wherein a data correctness value is associated with a probability that a measured value is correct;

adding a data element including a single data correctness value for each measured value for each identifier with which a respective measured value is associated to the ground truth dataset, wherein the single data correctness value being based on the determined data correctness values for the measured values, whereby the data correctness values in the ground truth dataset define probability distributions of data correctness for the measured values; and outputting the ground truth dataset, wherein the ground truth dataset is used to determine data correctness of measured values included in at least one new dataset by receiving the new dataset from a data source, the new dataset comprising a plurality of data elements, wherein each data element of the new dataset includes an identifier and at least one measured value associated with the identifier; and using respective data correctness values in the ground truth dataset for the measured values of respective data elements of the ground truth dataset determined as being with known identifiers, in determining data correctness values for measured values of data elements of the new dataset, wherein a known identifier is an identifier which is included in the ground truth dataset and in the new dataset, wherein determining data elements of the ground truth dataset with known identifiers comprising comparing identifiers included in the new dataset with identifiers included in the ground truth dataset, wherein data correctness values in the ground truth dataset are assigned for measured values of data elements of the new dataset based on overlapping of the measured values of data elements of the new dataset with measured values of data elements of the ground truth dataset with known identifiers.

2. The computer implemented method of claim 1, wherein the at least one processor is further configured to determine a data correctness value for a measured value received from a respective data source for a subset of data elements received from the respective data source and to assign the data correctness value for the measured value determined for the subset of the data elements to the measured values of a same sensor information of the other data elements received from the respective data source.

3. The computer implemented method of claim 1, wherein the at least one processor is used to determine the single data correctness value for the respective measured value for a respective identifier based on data correctness values for the measured value received from different data sources, when two or more data elements with the respective identifier and an identical measured value are included in the plurality of datasets received from the different data sources.

4. The computer implemented method of claim 3, wherein the at least one processor is used to determine the single data correctness value for the respective measured value for the respective identifier by calculating $$p = \frac{\prod_{i}^{n} p_i}{\prod_{i}^{n} p_i + \prod_{i}^{n} (1 - p_i)}$$

wherein p is a single data correctness value, n is a number of the different data sources, and $p_i$ is a probability for the measured value received from data source i to be correct.

5. The computer implemented method of claim 1, wherein the at least one processor is used to determine the single data correctness value for the respective measured value for a respective identifier based on calculating $$p_i = \frac{\sum_{j}^{k} p_{ij}}{k}$$

wherein $p_i$ is a mean probability for the measured value received from the data source i to be correct, k is a number of probabilities for the measured value of the data element received from the data source i to be correct, and $p_{ij}$ is a j-th probability for the measured value of the data element of the data source i to be correct, when two or more data elements with the respective identifier and an identical measured value are included in one or more datasets received from the same data source.

6. The computer implemented method of claim 1, wherein the at least one processor is further used to determine a data correctness value for at least one measured value of data elements of the new dataset with unknown identifier based on a probability distribution of data correctness for the respective measured value, when the new dataset comprises a threshold level of data elements including a known identifier, wherein an unknown identifier is an identifier which is not included in the ground truth dataset.

7. The computer implemented method of claim 6, wherein the at least one processor is used for:
obtaining the probability distribution of data correctness for the respective measured value based on the ground truth dataset,
binning of data correctness values of the probability distribution of data correctness for the respective measured value, wherein each bin includes data elements of the ground truth dataset with data correctness values for the respective measured value within a range of data correctness values for the respective measured value,
extracting, from each bin, a number of samples each including a number of data elements,
determining, for each sample, a number of data elements with identifiers in a respective sample which are identical to identifiers in the new dataset, wherein the respective sample is discarded if the number of data elements with identifiers in the respective sample which are identical to identifiers in the new dataset is below a threshold identifier number and wherein the respective sample is further processed if the number of data elements with identifiers in the respective sample which are identical to identifiers in the new dataset is equal to or above the threshold identifier number,
determining for each sample a sample probability score based on the data correctness values for the respective measured value of the data elements with identical identifiers in the ground truth dataset and the new dataset,
determining for each bin a bin probability score of a respective bin based on the sample probability scores of the respective bin,
determining for each bin a weighted bin score by multiplying a respective bin probability score with a respective number of data elements with identifiers in the respective bin which are identical to identifiers in the new dataset,
determining for each bin a confidence score based on a respective weighted bin score and the respective number of data elements with identifiers in the respective bin which are identical to identifiers in the new dataset,
determining a final score by dividing a sum of the confidence scores by a sum of the number of data elements with identifiers in the bins which are identical to identifiers in the new dataset, and
assigning the final score as data correctness value to the measured value of the data elements of the new dataset with unknown identifier.

8. The computer implemented method of claim 7, wherein the at least one processor is used to determine the confidence score for each of the bins based on Wilson confidence interval.

9. The computer implemented method of claim 1; wherein the at least one processor is used to add, to the ground truth dataset, the data elements of the new dataset with unknown identifier for which the data correctness values for the measured values were determined.

10. The computer implemented method of claim 1, wherein the at least one processor is used to compare the data correctness values for a respective measured value of respective data elements of the ground truth dataset to data correctness values for the respective measured value of the respective data elements determined using at least one of a panel and calibration measurements for checking correctness of the measured values in dependence of a triggering event.

11. The computer implemented method of claim 10, wherein the at least one processor is used to adjust the data correctness values for the respective measured value of the respective data elements of the ground truth dataset based on a difference between the data correctness values for the respective measured value of the respective data elements of the ground truth dataset and the data correctness values for the respective measured value of the respective data elements determined using at least one of a panel and calibration measurements for checking correctness of the measured values.

12. The computer implemented method of claim 10, wherein the at least one processor is used for:
obtaining a probability distribution of data correctness for the respective measured value based on the ground truth dataset,
binning of data correctness values of the probability distribution of data correctness for the respective measured value, wherein each bin includes data elements of the ground truth dataset with data correctness values for the respective measured value within a range of data correctness values for the respective measured value,
determining, for each bin, a bin data correctness value for the respective measured value using at least one of a panel and calibration measurements for checking correctness of the measured values,
learning an adjustment weight for the data correctness values for the respective measured value for the data elements for each bin based on minimizing a difference between a median data correctness value for the respective bin determined based on the data correctness values for the respective measured value in a respective bin weighted based on a current adjustment weight and the bin data correctness value for the respective bin, and
adjusting, for each data element, the data correctness value for the respective measured value in the ground truth dataset based on the respective adjustment weight.

13. The computer implemented method of claim 12, wherein the at least one processor is used to perform determining, for each bin, a bin data correctness value for the respective measured value using at least one of a panel and calibration measurements for checking correctness of the measured values based on a subset of data elements selected from the respective bin.

14. The computer implemented method of claim 1, wherein the measured values are received from one or more sensor devices.

15. A data correctness management system for improving data correctness using a ground truth dataset, comprising:
a transceiver; and
at least one processor coupled to the transceiver, the at least one processor executing a code comprising:
program instructions to receive, via the transceiver, a plurality of datasets from different data sources, the datasets comprising a plurality of data elements, wherein each data element includes an identifier and at least one measured value associated with the identifier;
program instructions to determine data correctness values for the measured values using at least one of a panel and calibration measurements for checking correctness of the measured values, wherein a data correctness value is associated with a probability that a measured value is correct; and
program instructions to add a data element including a single data correctness value for each measured value for each identifier with which a respective measured value is associated to the ground truth dataset, wherein the single data correctness value being based on the determined data correctness values for the measured values, whereby the data correctness values in the ground truth dataset define probability distributions of data correctness for the measured values, and
program instructions to receive a new dataset from a data source, the new dataset comprising a plurality of data elements, wherein each data element of the new dataset includes an identifier and at least one measured value associated with the identifier; and to
use respective data correctness values in the ground truth dataset for the measured values of respective data elements of the ground truth dataset determined as being with known identifiers, in determining data correctness values for measured values of data elements of the new dataset, wherein a known identifier is an identifier which is included in the ground truth dataset and in the new dataset, wherein determining data elements of the ground truth dataset with known identifiers comprising comparing identifiers included in the new dataset with identifiers included in the ground truth dataset, wherein data correctness values in the ground truth dataset are assigned for measured values of data elements of the new dataset based on overlapping of the measured values of data elements of the new dataset with measured values of data elements of the ground truth dataset with known identifiers.

16. The data correctness management system of claim 15, the code comprising program instructions to determine a data correctness value for measured values of data elements of the new dataset with unknown identifier based on a probability distribution of data correctness for a respective measured value, when the new dataset comprises a threshold level of data elements including a known identifier, wherein an unknown identifier is an identifier which is not included in the ground truth dataset.

17. The data correctness management system of claim 15, the code further comprising program instructions to compare the data correctness values for a respective measured value of respective data elements of the ground truth dataset to data correctness values for the respective measured value of the respective data elements determined using at least one of a panel and calibration measurements for checking correctness of the measured values and to adjust the data correctness values for the respective measured value of the respective data elements of the ground truth dataset based on a difference between the data correctness values for the respective measured value of the respective data elements of the ground truth dataset and the data correctness values for the respective measured value of the respective data elements determined using at least one of a panel and calibration measurements for checking correctness of the measured values.

18. The data correctness management system of claim 15, wherein the measured values are received from one or more sensor devices.

* * * * *